(12) United States Patent
Liu et al.

(10) Patent No.: US 7,693,908 B2
(45) Date of Patent: Apr. 6, 2010

(54) DETERMINATION OF TIME DEPENDENCY OF SEARCH QUERIES

(75) Inventors: Ning Liu, Beijing (CN); Jun Yan, Beijing (CN); Benyu Zhang, Beijing (CN); Zheng Chen, Beijing (CN); Jian Wang, Beijing (CN)

(73) Assignee: Microsoft Corporation, Redmond, WA (US)

(*) Notice: Subject to any disclaimer, the term of this patent is extended or adjusted under 35 U.S.C. 154(b) by 222 days.

(21) Appl. No.: 11/770,358

(22) Filed: Jun. 28, 2007

(65) Prior Publication Data

US 2009/0006312 A1    Jan. 1, 2009

(51) Int. Cl.
*G06F 17/30* (2006.01)

(52) U.S. Cl. .................... 707/751; 707/776; 706/8

(58) Field of Classification Search .............. None
See application file for complete search history.

(56) References Cited

U.S. PATENT DOCUMENTS

| | | | |
|---|---|---|---|
| 5,544,049 | A | 8/1996 | Henderson et al. |
| 5,734,893 | A | 3/1998 | Li et al. |
| 5,940,825 | A | 8/1999 | Castelli et al. |
| 6,411,950 | B1 | 6/2002 | Moricz et al. |
| 6,421,675 | B1 | 7/2002 | Ryan et al. |
| 6,446,060 | B1 | 9/2002 | Bergman et al. |
| 6,473,753 | B1 | 10/2002 | Katariya et al. |
| 6,496,817 | B1 | 12/2002 | Whang et al. |
| 6,606,417 | B1 | 8/2003 | Brechner |
| 6,650,998 | B1 | 11/2003 | Rutledge et al. |
| 6,732,088 | B1 | 5/2004 | Glance |
| 6,745,178 | B1 | 6/2004 | Emens et al. |
| 6,778,981 | B2 | 8/2004 | Lee et al. |
| 6,785,672 | B1 | 8/2004 | Floratos et al. |
| 6,832,218 | B1 | 12/2004 | Emens et al. |
| 7,016,892 | B1 | 3/2006 | Kokkonen et al. |
| 7,051,023 | B2 | 5/2006 | Kapur et al. |
| 7,082,428 | B1 | 7/2006 | Denny et al. |
| 7,149,732 | B2 | 12/2006 | Wen et al. |
| 7,158,966 | B2 | 1/2007 | Brill et al. |
| 2002/0116379 | A1* | 8/2002 | Lee et al. ................ 707/5 |
| 2002/0184212 | A1* | 12/2002 | Ugai et al. ............... 707/6 |

(Continued)

OTHER PUBLICATIONS

The Analysis of Time Series, by Chatfield, Christopher, 6th ed., Boca Raton, 2004, pp. 107-109, 111, 112. Available at http://books.google.com Last visited: Jun. 4, 2009.*

(Continued)

*Primary Examiner*—Neveen Abel-Jalil
*Assistant Examiner*—Daniel Kinsaul
(74) *Attorney, Agent, or Firm*—Perkins Coie LLP

(57) ABSTRACT

Techniques for analyzing and modeling the frequency of queries are provided by a query analysis system. A query analysis system analyzes frequencies of a query over time to determine whether the query is time-dependent or time-independent. The query analysis system forecasts the frequency of time-dependent queries based on their periodicities. The query analysis system forecasts the frequency of time-independent queries based on causal relationships with other queries. To forecast the frequency of time-independent queries, the query analysis system analyzes the frequency of a query over time to identify significant increases in the frequency, which are referred to as "query events" or "events." The query analysis system forecasts frequencies of time-independent queries based on queries with events that tend to causally precede events of the query to be forecasted.

13 Claims, 22 Drawing Sheets

U.S. PATENT DOCUMENTS

| | | |
|---|---|---|
| 2004/0193612 A1 | 9/2004 | Chang |
| 2005/0050033 A1 | 3/2005 | Thomas et al. |
| 2005/0102259 A1 | 5/2005 | Kapur |
| 2005/0144065 A1 | 6/2005 | Calabria et al. |
| 2005/0198068 A1 | 9/2005 | Mukherjee et al. |
| 2005/0234877 A1 | 10/2005 | Yu |
| 2006/0117003 A1 | 6/2006 | Ortega et al. |
| 2006/0136370 A1* | 6/2006 | Buckler ......................... 707/2 |
| 2006/0224356 A1* | 10/2006 | Castelli et al. .............. 702/176 |
| 2006/0248068 A1 | 11/2006 | Chien et al. |
| 2007/0043706 A1 | 2/2007 | Burke et al. |
| 2007/0067267 A1 | 3/2007 | Ives |
| 2007/0067283 A1 | 3/2007 | Sengupta |
| 2007/0097755 A1 | 5/2007 | Marndi et al. |
| 2007/0112764 A1 | 5/2007 | Yih et al. |
| 2007/0121674 A1* | 5/2007 | Chen et al. .................. 370/468 |
| 2007/0143278 A1 | 6/2007 | Srivastava et al. |
| 2007/0143300 A1 | 6/2007 | Gulli et al. |
| 2008/0144124 A1 | 6/2008 | Samadani et al. |
| 2008/0154877 A1 | 6/2008 | Joshi et al. |
| 2008/0183685 A1 | 7/2008 | He et al. |
| 2009/0049029 A1* | 2/2009 | Choi et al. ...................... 707/5 |

OTHER PUBLICATIONS

"Time-Dependent Semantic Similarity Measure of Queries Using Historical Click-Through Data," by Zhao et al., In: WWW 2006, Edinburgh, Scotland (2006). Available at ACM.*

"Identifying Similarities, Periodicities and Bursts for Online Search Queries," by Vlachos et al., In: SIGMOD 2004, Paris, France (2004). Available at: ACM.*

U.S. Appl. No. 11/770,505, Liu et al.
U.S. Appl. No. 11/770,462, Liu et al.
U.S. Appl. No. 11/770,445, Liu et al.
U.S. Appl. No. 11/770,423, Liu et al.
U.S. Appl. No. 11/770,385, Liu et al.
U.S. Appl. No. 11/770,307, Liu et al.

"Search-Query Trend Analysis with Internal- and External- Correlation", *Conference '04*. Copyright 2004 ACM 1-58113-000-0/00/0004.

Abfalg, et al. "Similarity Search on Time Series Based on Threshold Queries", 2006 (18 pages).

Baeza-Yates, et al. "Query Recommendation using Query Logs in Search Engines", *Current Trends in Database Technology—EDBT 2004 Workshops*. Eds. Wolfgang Lindner, et al. Berlin: Springer, 2004.

Caraca-Valente, et al. "Discovering Simliar Patterns in Time Series", *KDD 2000*, Boston, MA, Copyright ACM 2000 (9 pages).

Chien, et al. "Semantic Similarity Between Search Engine Queries Using Temporal Correlation", *Proceedings of the 14the International Conference on the World Wide Web* (Chiba, Japan, 2005), pp. 2-11.

Enrico. "Multiscale Analysis of Stock Index Return Volatility", *Computational Economics*, 2004. vol. 23, Issue 3, pp. 219-237.

Ghysels. "Time-Series Model with periodic stochastic regime switching", *Macroeconomic Dynamics* (2000), 4: pp. 467-486.

Granger. "Investigating Casual Relations by Econometric Models and Cross-spectral Methods", *Econometrics*, vol. 27, pp. 424-438, 1969.

Guralnik, et al. "Event Detection from Time Series Data", *Proceedings of the Fifth International Conference on Knowledge Discovery and Data Mining* (KDD), San Diego, California, USA, pp. 33-42, 1999.

Joachims. "Optimizing Search Engines using Clickthrough Data", *SIGKDD 02*, Edmonton, Alberta, Canada, Copyright 2002 ACM 1-58113-567-X/02/0007.

Keogh, et al. "Dimensionality Reduction for Fast Similarity Search in Large Time Series Databases", *Knowledge and Information Systems*, 3 (3). 2000, pp. 263-286.

Keogh, et al. "Finding Surprising Patterns in a Time Series Database in Linear Time and Space", *Proceedings of the Eighth International Conference on Knowledge Discovery and Data Mining* (KDD), Edmonton, Alberta, Canada, pp. 550-556, 2002.

Lau, et al. "Patterns of Search: Analyzing and Modeling Web Query Refinement", *Proceedings of the Seventh International Conference on User Modeling*, Banff, Canada. pp. 119-128. Year of Publication: 1999. ISBN:3-211-83151-7.

Liu, et al. "Semantic Overall and Partial Similarity of Temporal Query Logs", *2006 IEEE International Conference on Data Mining*, Dec. 18-22, 2006, Hong Kong. Microsoft Research Asia, Beijing.

Liu, Ning, et al., "Similarity of Temporal Query Logs Based on ARIMA Model," *Proceedings of the Sixth International Conference on Data Mining* (ICDM '06), Copyright 2006 (5 pages).

Pratt. "Locating Patterns in Discrete Time-Series," May 2001.

Sims. "Money, Income, and Causality", *The American Economic Review*, vol. 62, pp. 540-552, 1972.

Sun, et al. "Casual Relation of Queries from Temporal Logs", *WWW 2007*, May 8-12, 2007, Banff, Alberta, Canada. ACM 978-1-59593-654-7/07/0005.

Vlachos, et al. "Fast Burst Correlation of Finanical Data", *Presented at 9th European Conference of Practices in Knowledge and Data Discovery (PKDD)*, Porto, Portugal, pp. 268-379, 2005.

Vlachos, et al. "Identifying Similarities, Periodicities and Bursts for Online Search Queries", *SIGMOD 2004*, Jun. 13-18, 2004 (12 pages).

Wen, et al. "Query Clustering Using User Logs", *ACM Transactions on Information Systems (TOIS)*, vol. 20, Issue 1, Jan. 2002. pp. 59-81.

Wen-tau, et al. "Finding Advertising Keywords on Web Pages", *Proceedings of the 15th International Conference on World Wide Web (WWW)*, Edinburgh, Scotland, 2006.

Xia, et al. "Indexing and Querying Constantly Evolving Data Using Time Series Analysis", 2005 (12 pages).

Zaiane, et al. "Finding Similar Queries to Satisfy Searches Based on Query Traces", *OOIS Workshops* 2002: 207-216.

"AFL Draws," University of Melbourne Statistical Consulting Centre. last modified: 2005. Available at www.scc.ms.unimelb.edu.au/whatisstatistics/afldraws.html [last accessed Jun. 8, 2009].

"Multiple Regression," by StatSoft, Inc. Available at http://www.statsoft.com/textbook/stmulreg.html. Retrieved from the Wayback Machine at http://web.archive.org/web/20050101-20050201re_/http://www.statsoft.com/textbook/stmulreg.html [last retrieved on Jun. 10, 2009].

Groschwitz and Polyzos, "A Time Series Model of Long-Term NSFNET Backbone Traffic," In: Proceedings of the IEEE Int'l Conference on Communication (1994). Available at http://citeseerx, ist.psu.edu/viewdoc/summary?doi=10.1.1.45.7322 [last accessed Jun. 18, 2009].

Kage and Sumiya, "A Web Search Method Based on the Temporal Relation of Query Keywords," WISE 2006 (2006). Available at Springer-Link.

Sang and Li, "A Predictability Analysis of Network Traffic," In: Proceedings of IEEE INFOCOM.2000. Available at http://citeseerx.ist.psu.edu/viewdocs/summary?doi=10.1.1.41.4537 [last accessed Jun. 18, 2009].

Yamauchi and Mukaidono, "Probabilistic Inference and Bayseian Theorem based on Logical Implication," 1999. Available at Springer-Link.

Zushi et al., "A Vector space Retrieval Method with Causal Relationship Computation Functions for Event Data," In: Proceedings for the 2005 Symposium on Applications and the Internet Workshops (2005). Available at IEEE.

* cited by examiner

DETERMINATION OF TIME DEPENDENCY OF SEARCH QUERIES

CROSS-REFERENCE TO RELATED APPLICATIONS

The present application is related to U.S. patent application Ser. No. 11/770,385 entitled "Forecasting Time-Dependent Search Queries," U.S. patent application Ser. No. 11/770,423 entitled "Identification of Events of Search Queries," U.S. patent application Ser. No. 11/770,445 entitled "Forecasting Time-Independent Search Queries," and U.S. patent application Ser. No. 11/770,462 entitled "Forecasting Search Queries Based on Time Dependencies," which are being filed concurrently and which are hereby incorporated by reference in their entireties.

BACKGROUND

Many search engine services, such as Google and Yahoo, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Search engine services obtain revenue by placing advertisements along with search results. These paid-for advertisements are commonly referred to as "sponsored links," "sponsored matches," or "paid-for search results." An advertiser who wants to place an advertisement (e.g., a link to their web page) along with certain search results provides a search engine service with an advertisement and one or more bid terms. When a search request is received, the search engine service identifies the advertisements whose bid terms match the terms of the search request. The search engine service then selects advertisements to display based on the closeness of their match, the amount of money that the advertisers are willing to pay for placing the advertisement, and other factors. The search engine service then adds a sponsored link to the search result that points to a web page of the advertiser. The search engine services typically either charge for placement of each advertisement along with search results (i.e., cost per impression) or charge only when a user actually selects a link associated with an advertisement (i.e., cost per click).

Advertisers would like to maximize the effectiveness of their advertising dollars used to pay for advertisements. Thus, advertisers try to identify bid term, advertisement, and bid amount combinations that result in the highest benefits (e.g., most profit) to the advertiser. Advertisers may analyze query trends to identify bid terms, timing for placing advertisements based on those bid terms, bid amounts for those bid terms, and so on. Query trend analysis studies how the frequency of queries changes over time and is used to predict the future frequency of queries. If query trends can be accurately predicted, then advertisers can adjust their placement of advertisements in an attempt to maximize the advertising effectiveness. For example, if a query is likely to increase in the near future, an advertiser may want to increase the bid amount for terms of that query. It has been, however, difficult to accurately model the frequency of queries.

SUMMARY

Techniques for analyzing and modeling the frequency of queries are provided by a query analysis system. A query analysis system analyzes frequencies of a query over time to determine whether the query is time-dependent or time-independent. The frequency of a time-dependent query is likely to vary with a certain periodicity or multiple periodicities. A time-independent query, in contrast, tends to have no observable correlation with time. The query analysis system forecasts the frequency of time-dependent queries based on their periodicities. The query analysis system forecasts the frequency of time-independent queries based on causal relationships with other queries. To forecast the frequency of time-independent queries, the query analysis system analyzes the frequency of a query over time to identify significant increases in the frequency, which are referred to as "query events" or "events." To assist a user in determining the cause of an event for a query, the query analysis system may display an indication of the top search results that were selected by searchers who submitted that query. The query analysis system may also generate graphs of the frequency of a query that indicate the past frequency of the query and the forecasted or predicted frequency of the query for both time-dependent queries and time-independent queries.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
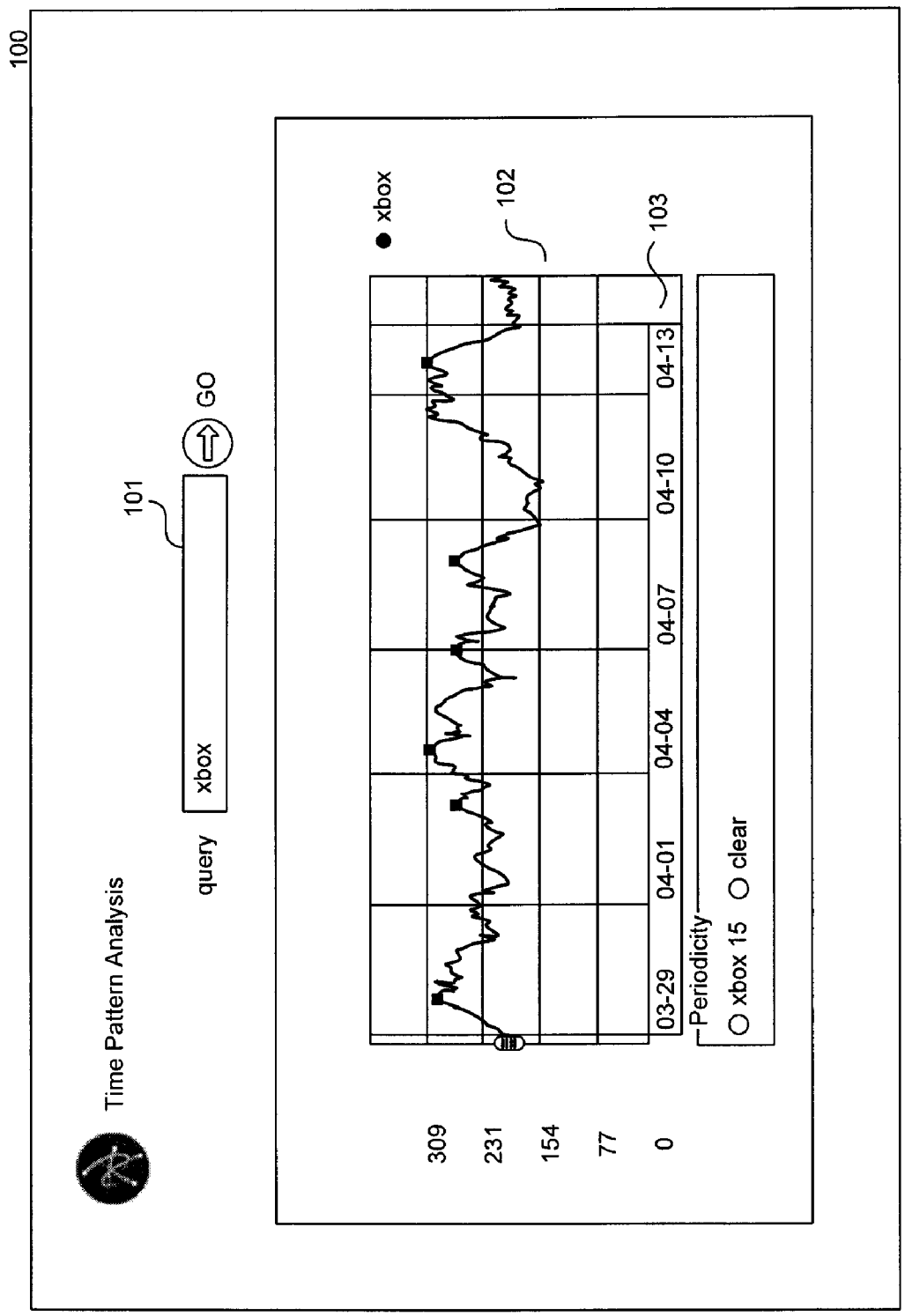
FIG. 1 illustrates a graph of past and predicted frequencies.

Techniques for analyzing and modeling the frequency of queries are provided by a query analysis system. In some embodiments, a query analysis system analyzes frequencies of a query over time to determine whether the query is time-dependent or time-independent. The frequency of a time-dependent query is likely to vary with a certain periodicity or multiple periodicities. A time-independent query, in contrast, tends to have no observable correlation with time. For example, the query "Christmas gift" is likely to have a periodicity of one year and is thus time-dependent, while the query "Harry Potter" may have no discernible periodicity and is thus time-independent. The query analysis system forecasts the frequency of time-dependent queries based on their periodicities. The query analysis system forecasts the frequency of time-independent queries based on causal relationships with other queries. For example, the query "Asian tsunami" may be causally related to the query "Asian map." Analysis of the frequency of the query "Asian map" indicates that it has increased dramatically as the frequency of the query "Asian tsunami" has increased. In particular, the query "Asian tsunami" became very popular in late December 2004 because many users submitted that query to obtain information about the recent Asian tsunami. To forecast the frequency of time-independent queries, the query analysis system analyzes the frequency of a query over time to identify significant increases in the frequency, which are referred to as "query events" or "events." For example, an event occurred in late December 2004 for the query "Asian tsunami." To assist a user in determining the cause of an event for a query, the query analysis system may display an indication of the top search results that were selected by searchers who submitted that query. For example, in the case of the query "Asian tsunami," the top search results selected by the searchers were links to web pages with news stories describing the tsunami. The query analysis system may also generate graphs of the frequency of a query that indicate the past frequency of the query and the forecasted or predicted frequency of the query for both time-dependent queries and time-independent queries.

In some embodiments, the query analysis system determines the time dependency of a query by analyzing the frequency of the query over time. Because the query analysis system analyzes the frequency of the query itself, the analysis is referred to as an internal analysis that only considers factors internal to the query itself. The query analysis system calculates the value of the frequency spectral for the frequencies of the queries at various angular frequencies. The value of the frequency spectral for an angular frequency measures the occurrences of the frequency of the query at that angular frequency. For example, for the query "Christmas gift," the value of the frequency spectral for the angular velocity corresponding to 365 days will likely be large, indicating that the frequency of the query increases with a periodicity of 365 days. After generating the values of the frequency spectral, the query analysis system analyzes the values, identifying peaks indicating an angular frequency at which the frequency of the query increases. Each peak may correspond to a periodicity of the query. If the query analysis system identifies at least one peak, then it may designate the query as a time-dependent query. If the query analysis system does not identify any peaks, then it may designate the query as a time-independent query.

In some embodiments, the query analysis system uses a time-dependent query model that is based on the periodicities of a time-dependent query to forecast the frequency of query. For each periodicity of a time-dependent query, the query analysis system generates various parameters for that periodicity for the model. These parameters may be based on the angular frequency, the amplitude of the angular frequency, and the phase of the angular frequency. The query analysis system may also assess the accuracy of the model by comparing actual frequencies to frequencies predicted by the model. If the accuracy of the model for a query is high, the query analysis system uses the parameters of the periodicities of the query to predict future frequencies of the query. If the accuracy is low, then the query analysis system may indicate that the frequency of the query cannot be accurately predicted based on its time dependency. In such a case, the query analysis system may attempt to forecast the frequency of the query using a time-independent query model.

In some embodiments, the query analysis system forecasts a time-independent query based on analysis of its causal relationship with other queries. Since this analysis is based on other queries, it is referred to as an external analysis based on external factors. To generate a time-independent query model for a target query, the query analysis system generates a query causal score for pairs of queries that include the target query and another query. A query causal score measures the likelihood that the other query of the pair causes the target query. The query analysis system generates a query causal score for a pair of queries by identifying the events within each query and generating an event causal score that measures the likelihood that an event of the other query has a causal relationship with an event of the target query. The query analysis system then aggregates the event causal scores to generate the query causal score. The queries with high query causal scores are candidate queries to be the likely cause of the target query.

In some embodiments, the query analysis system generates a time-independent query model for forecasting time-independent queries based on the frequencies of the candidate queries that are likely to be the cause of the target query. The query analysis system may use a multiple regression technique to generate a weight for each candidate query indicating its overall influence on the frequency of the target query. For example, a candidate query with a relatively low causal relationship may have a weight of 0.01, whereas a candidate query with a relatively high causal relationship may have a weight of 0.4. The query analysis system then uses weights for a target query and the frequencies of the candidate queries to predict the frequency of the target query. To predict the frequency, the query analysis system retrieves the frequencies for the candidate queries and generates a weighted sum of those frequencies as the predicted frequency of the target query.

The query analysis system may extract the count or frequency of queries from a query log for an interval (e.g., a day). The query analysis system represents each query Q by a time series Q={$q_1, q_2, \ldots, q_N$}, where N is the length of the time series and $q_i$ is the query frequency on the ith interval. One skilled in the art will appreciate that the interval may be a day, more than a day (e.g., two days or seven days), or less than a day (e.g., 12 hours) depending on the goals of the query analysis system.

In some embodiments, the query analysis system uses a cosine signal hidden periodicity ("CSHP") model to determine the time dependency of a query. The CSHP model may be represented as follows:

$$q_t = \sum_{j=1}^{k} A_j \cos(\omega_j t + \varphi_j) + \xi_t \quad (1)$$

where $A_j$ represents the amplitude of the angular velocity $\omega_j$ for angular frequency j, $\varphi_j$ represents the phase of the angular velocity $\omega_j$ for angular frequency j, and $\xi_t$ represents background noise. The periodicities of $q_t$ are represented as follows:

$$T_j = 2\pi/\omega_j, j=1, 2, \ldots, k \quad (2)$$

(See Box, G., Jenkins, G. M., Reinsel, G., "Time Series Analysis, Forecasting and Control," Prentice Hall, 1994; Chatfield, C., "The Analysis of Time Series: An Introduction," Chapman & Hall/CRC, 1996; and Enders, W., "Applied Econometric Time Series," Wiley, 2003.)

In some embodiments, to simplify parameter estimation, the query analysis system extends the model to the complex domain as represented by the following:

$$q_t = \sum_{j=1}^{q} \alpha_j \exp(it\lambda_j) + \xi_t \quad (3)$$

where

-continued $$q = 2k,$$

$$\lambda_j \begin{cases} \omega_j & j = 1, 2, \ldots, k \\ -\omega_{j-k} & j = k+1, k+2, \ldots, k \end{cases}$$

$$\alpha_j \begin{cases} \frac{1}{2} A_j \exp(i\varphi_j) & j = 1, 2, \ldots, k \\ \frac{1}{2} A_{j-k} \exp(-i\varphi_{j-k}) & j = k+1, k+2, \ldots, q \end{cases}$$

For a time series {$q_1, q_2, \ldots, q_N$}, the value frequency spectral of the model is represented by the following:

$$S_N(\lambda) = \sum_{t=1}^{N} q_t e^{-i\lambda t} \quad \lambda \in [-\pi, \pi] \quad (4)$$

The number of peaks in the frequency spectral is an estimate of the number of periodicities, and a peak is a local maximum of the values of the frequency spectral as represented by the following:

$$S_N(\lambda_j) \geq S_N(\lambda), \text{ where } \lambda \in [\lambda_j - 1/2\sqrt{N}, \lambda_j + 1/2\sqrt{N}] \quad (5)$$

where $\lambda_j, j=1, 2, \ldots, k$ represents the angular frequency of the peaks.

To generate a time-dependent query model for a query, the query analysis system estimates the parameters for the model as follows:

$$\omega_j = \lambda_j^*, T_j = \frac{2\pi}{\omega_j} \quad (6)$$

$$= \frac{2\pi}{\lambda_j^*}, \alpha_j = \sum_{t=1}^{N} q_t e^{-i\lambda_j^* t},$$

$$A_j = 2|\alpha_j| \text{ and } \varphi_j = \arg(\alpha_j)$$

where $\lambda^*_j$ represents the angular frequency of the jth peak. The query analysis system may identify the peaks of the frequency spectral of a query as represented by the pseudocode of Table 1.

TABLE 1

| | |
|---|---|
| 1. | Calculate the mean of Q = {$q_1, q_2, \ldots, q_N$} as $\overline{Q} = \frac{1}{N}\sum_{t=1}^{N} q_t$ |
| 2. | Centralize Q to a zero mean time series as $x_t = q_t - \overline{Q}$, t = 1, 2, . . . , N |
| 3. | Identify peaks within the frequency spectral |
| 4. | If the frequency spectral has k peaks, output the periodicity $T_j$, else indicate that the query is time-independent |

Analysis of the frequency spectral for the query "Christmas gifts" indicates that there is a peak at an angular frequency of 0.018 with a periodicity as represented by the following:

$$T = 2\pi/0.018 \approx 365 \quad (7)$$

The query analysis system predicts the frequency of a time-dependent query using Equation 1 and the parameters generated for each periodicity of the query. The query analysis may check the accuracy of the time-dependent model for a query by comparing actual frequencies to predicted frequencies as represented by the pseudocode of Table 2.

TABLE 2

1. Estimate parameter of Equation 3
2. Calculate the predicted frequencies $\hat{Q} = \{\hat{q}_1, \hat{q}_2, \ldots, \hat{q}_N\}$ using Equation 3
3. Calculate a reconstruction error as $$RE = \frac{\frac{1}{N}\sum_{t=1}^{N}(q_t - \hat{q}_t)^2}{\frac{1}{k}\sum_{j=1}^{k} A_j}$$

The reconstruction error ("RE") represents a measure of the accuracy of the time-dependent query model for a query. If the reconstruction error is small, then the query analysis system uses the model to predict the frequency of the query.

In some embodiments, the query analysis system models the frequency of time-independent queries based on analysis of causally related queries. If the change in the frequency of one query consistently causes the frequency of another query to change within a time period, then the queries are causally related. The query analysis system may represent the causal relationship between two queries A and B as follows:

$$A \prec B \qquad (8)$$

where A causally precedes B. Causal relatedness is asymmetric in the sense that if A causally precedes B, then it is unlikely that B will causally precede A. Many techniques have been proposed for analyzing the causal relationship between variables. One such technique is the Granger Causality Test. (See Frankes, W. B. and Baeza-Yates, R., "Information Retrieval: Data Structures and Algorithms," Prentice Hall PTR, 1992.) Although such techniques may identify causally related variables with a high degree of confidence, these techniques are computationally expensive. For example, the computational complexity of determining the causal relatedness of queries may be $O(mn^2)$, where m represents the length of the time series and n represents the number of queries.

To avoid this computational complexity, the query analysis system, in some embodiments, represents each query as a sequence of query events. An event for a query occurs when a significant increase in the frequency of the query occurs over one or more intervals. The query analysis system then calculates a query causal score as a measurement of the degree to which a first query causally precedes a second query by aggregating event/query causal scores. An event/query causal score measures the degree to which a first event of the first query causally precedes second events of the second query. An event/query causal score may be a maximum of event causal scores that measures the degree to which a first event of the first query causally precedes a second event of the second query.

The query analysis system may identify events of a query when the frequency in a sequence of one or more intervals satisfies a baseline criterion and at least one of the frequencies in the sequence satisfies a climax criterion. For example, the baseline criterion may be that the frequencies of the sequence are above a baseline threshold $f_b$, and the climax criterion may be that the frequency of an interval is above a climax threshold frequency $f_c$. The query analysis system may designate the ith event of a query as $e_{iq}$. The query analysis system may represent a query as a sequence of events as follows:

$$Q = \{e_1^Q, e_2^Q, \ldots, e_M^Q\} \qquad (9)$$

with each event being represented as follows:

$$e^q = \langle id, t_b, t_e, t_c, ts_c \rangle \qquad (10)$$

where id represents the identifier of the event, $t_b$ and $t_e$ represent the start and end time of the event and specify the event period, $t_c$ represents the time of the climax, and $ts_c$ represents the frequency of the climax. The length of the event may be represented as $t_e - t_b$, and the importance of the event may be represented as $(t_e - t_b)^* ts_c$. The query analysis system represents the area of an event as a measure of importance of the event as follows:

$$S(e^q) = \frac{1}{2}(t_e - t_b) \times ts_c \qquad (11)$$

The sequence of events of a query may be considered a feature vector representing the query. The generating of a time-independent query model based on feature vectors thus represents a reduction in the dimensionality over conventional techniques that determine causal relatedness of variables. The query analysis system may identify events of a query as presented by the pseudocode of Table 3.

TABLE 3

1. Detect candidate events using a 3σ rule of Gaussian distribution
2. Merge candidate events that share substantially the same event period
3. Split candidate events that have a deep valley between climaxes The query analysis system may represent an event causal score as a probability of event $e_1$ causing event $e_2$ by the following:

$$P(e_1 \prec e_2) = \begin{cases} 0 & \text{if } t_b(e_1) \text{ after } t_b(e_2) \\ \frac{S(e_1) \cap S(e_2)}{\max(S(e_1), S(e_2))} & \text{else} \end{cases} \qquad (12)$$

where $S(e_i)$ represents the area of event $e_i$. The larger the area of the event and the larger its climax, the more important the event. The query analysis system represents the query causal score that a query A causes query B by the following:

$$P(A \prec B) = \frac{\sum_{i=1}^{M^A} S(e_i^A) P(e_i^A \prec B)}{\sum_{i=1}^{M^A} S(e_i^A)} \qquad (13)$$

$$= \frac{\sum_{i=1}^{M^A} S(e_i^A) \max_{1 \leq j \leq M^B} P(e_i^A \prec e_j^B)}{\sum_{i=1}^{M^A} S(e_i^A)}$$

where $A = \{e_1^A, e_2^A, \ldots, e_{M^A}^A\}$, $B = \{e_1^B, e_2^B, \ldots, e_{M^B}^B\}$, and $M^A$ represents the number of events in query A. The query analysis system represents the importance of an event to a query as the size of the area of the event relative to the aggregate size of the areas of the events of the query. The event/query causal score for the combination of an event of query A and the query B is the maximum event causal score for that event of query A and each event of query B. Therefore, the query causal score is an aggregation of the probabilities of events of query A causing events of query B weighted by the importance of the events of query A.

In some embodiments, the query analysis system generates a time-independent query model for forecasting query frequencies by combining frequencies of candidate queries that are identified as queries that are causally related to a target query whose frequency is to be forecasted. The query analysis system may represent a time series of a query to be forecasted as $Q=\{q_1, q_2, \ldots, q_N\}$ and candidate queries as $\{C_1, C_2, \ldots, C_n\}$. The time series of each candidate query may be represented as $C_i=\{C_{i1}, C_{i2}, \ldots, C_{iN}\}$. The query analysis system may use a multiple regression model to learn the weights of the candidate queries for the time-independent query model of the query as represented by the following:

$$Q=\beta_0+\beta_1 C_1+\beta_2 C_2+\ldots+\beta_n C_n+\xi \quad (14)$$

where $\xi$ represents background noise and $\beta_i$ represents the weight of the ith candidate query. The query analysis system sets parameters of the time-independent query model as the candidate queries along with their weights. The query analysis system calculates the weights by solving the linear equations as represented by the following:

$$\begin{cases} q_1 = \beta_0 + \beta_1 c_{11} + \beta_2 c_{21} + \ldots + +\beta_n C_{n1} \\ q_N = \beta_0 + \beta_1 c_{1N} + \beta_2 c_{2N} + \ldots + +\beta_n C_{nN} \end{cases} \quad (15)$$

To generate a prediction of the frequency of the target query for an interval, the query analysis system retrieves the frequencies of the candidate queries for that interval and sets the predicted frequency to the weighted sum of the frequencies of the candidate queries as represented by Equation 14.

FIGS. 1-5 are display pages illustrating graphs of the query analysis system in some embodiments. FIG. 1 illustrates a graph of past and predicted frequencies. A display page 100 includes a query field 101 and a graph 102. After a user enters a query into the query field, the query analysis system generates and displays the graph of the frequency for the query. The x-axis of the graph represents the intervals, and the y-axis represents the frequencies. The portion 103, which may be highlighted (e.g., shaded), indicates the interval for which the frequency for the query was predicted.

Figure 2:
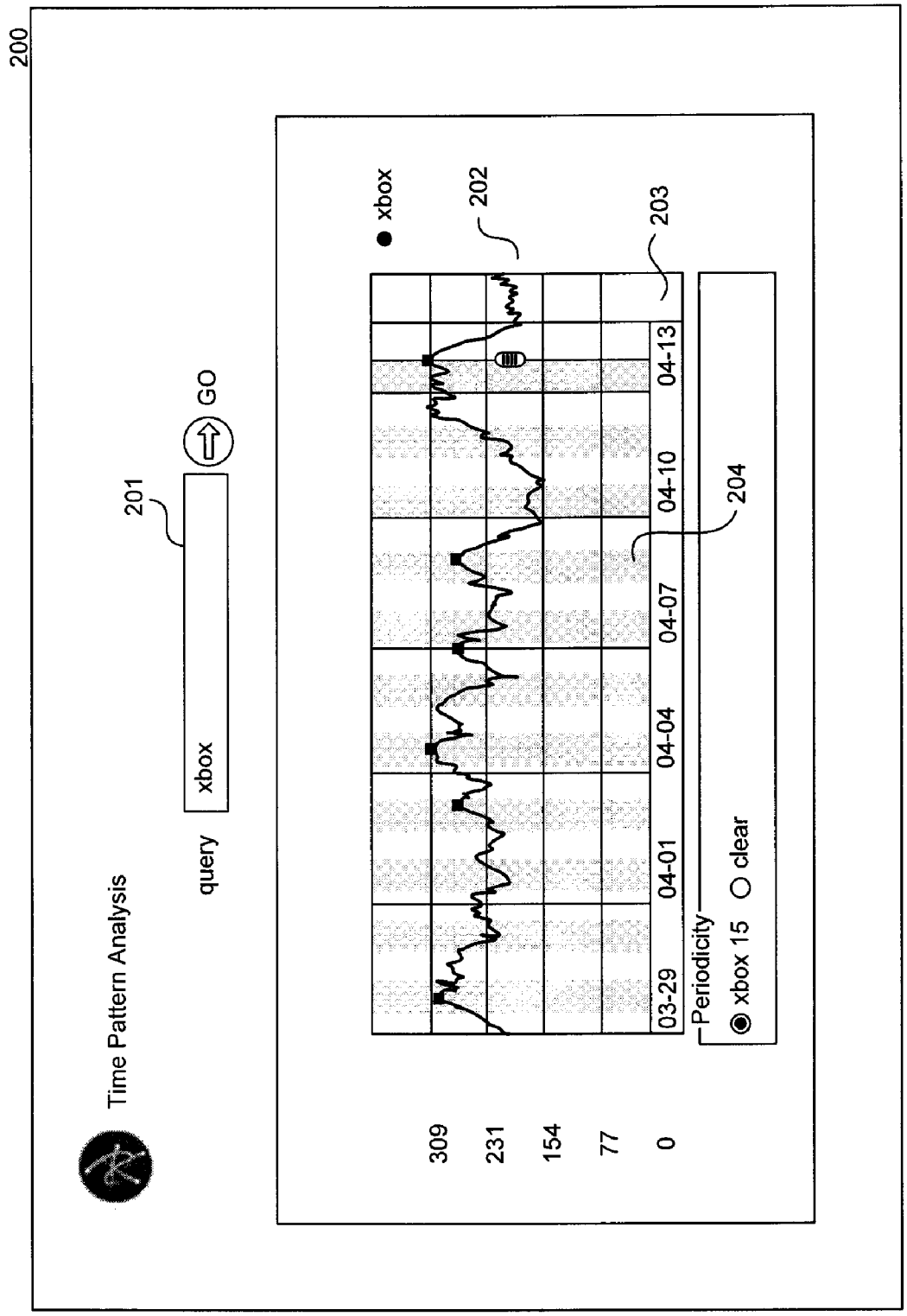
FIG. 2 illustrates a graph of past and predicted frequencies along with an indication of the periodicity of the query.

FIG. 2 illustrates a graph of past and predicted frequencies along with an indication of the periodicity of the query. A display page 200 includes a query field 201 and a graph 202. After a user enters a query into the query field, the query analysis system generates and displays the graph of the frequency for the query. The portion 203 indicates an interval for which the frequency for the query was predicted. The shaded portions 204 indicate the periodicity of the query. The query analysis may display a radio button for each periodicity of the query so that a user can view a graph with the different periodicity indicated.

Figure 3:
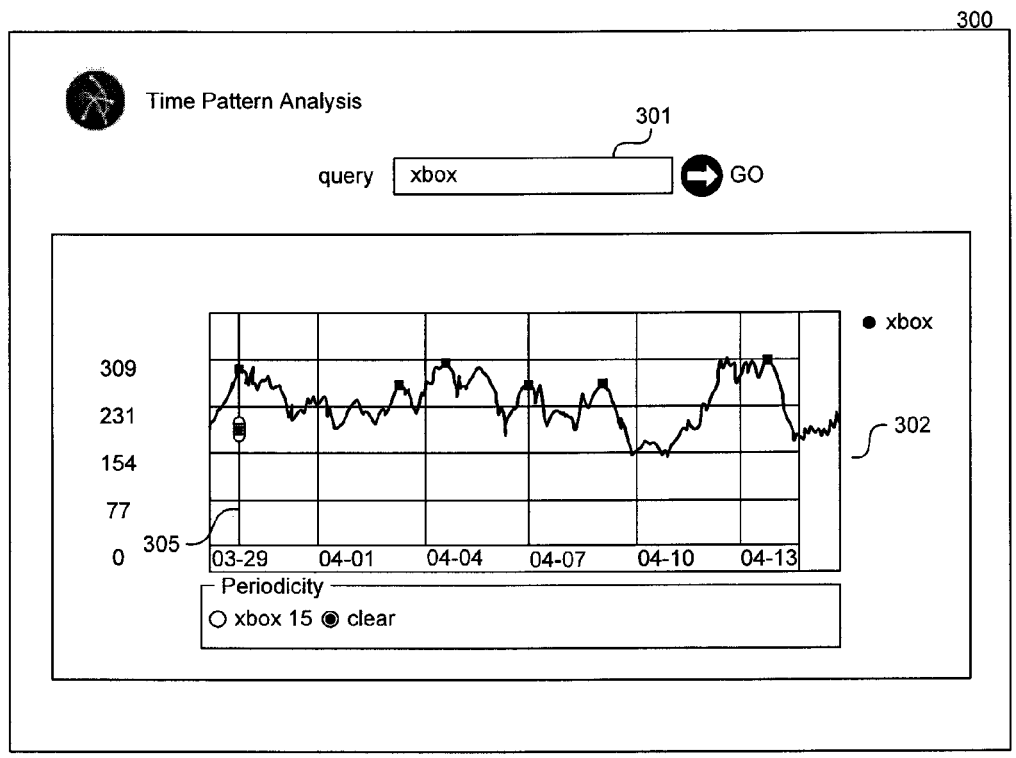
FIG. 3 illustrates a graph of past and predicted frequencies along with clickthrough information.
Figure 3:

FIG. 3 illustrates a graph of past and predicted frequencies along with clickthrough information. A display page 300 includes a query field 301, a graph 302, and clickthrough information 306. After a user enters a query into the query field, the query analysis system generates and displays the graph of the frequency for the query and clickthrough information. The portion 303 indicates an interval for which the frequency for the query was predicted. The user may select an interval 305 to display for the clickthrough data 306 for the query during that interval. The clickthrough data indicates the top search result items (e.g., their URLs) of that query that were selected by the searchers during that interval along with a count of the number of times each item was selected. The clickthrough data provides the user with information that may indicate why the searchers submitted the query or the type of information that the searchers were seeking.

Figure 4:
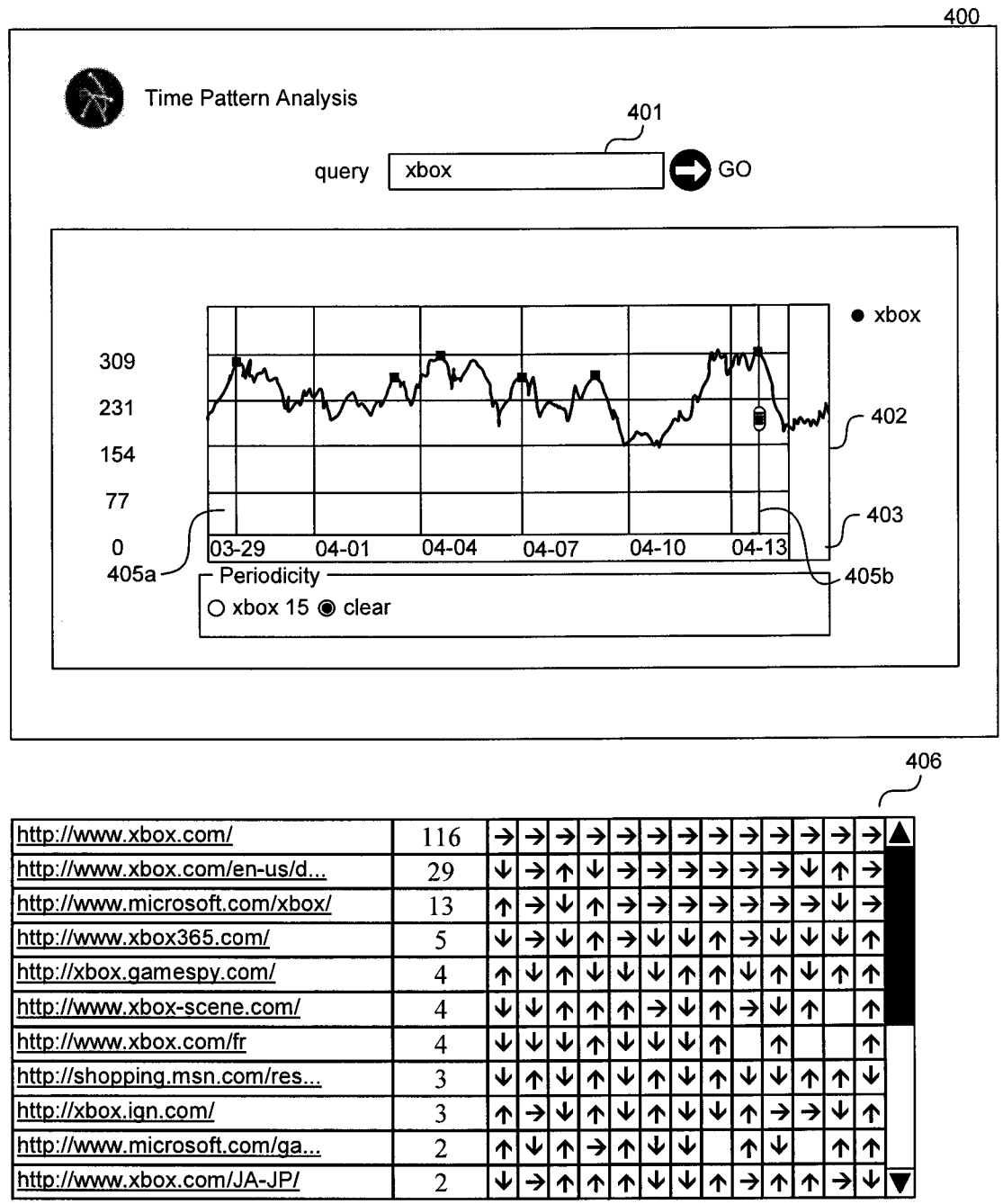
FIG. 4 illustrates a graph of past and predicted frequencies along with clickthrough data for a range of intervals.

FIG. 4 illustrates a graph of past and predicted frequencies along with clickthrough data for a range of intervals. A display page 400 includes a query field 401, a graph 402, and clickthrough data 406. After a user enters a query into the query field, the query analysis system generates and displays the graph of the frequency for the query. The portion 403 indicates an interval for which the frequency for the query was predicted. The user may select an interval range 405a to 405b to display an indication of the clickthrough data 406 for the query during that range of intervals. The clickthrough data indicates the top search results items (e.g., their URLs) of the search results of that query that were selected by the searchers during the interval at the start of the range. The clickthrough data also includes arrows for each interval of the range indicating whether the frequency of selection of items of the search results for the query increased or decreased from the previous interval and may indicate whether the change was significant by, for example, the color of the arrow. The arrows are referred to as an interval trend chart.

Figure 5:
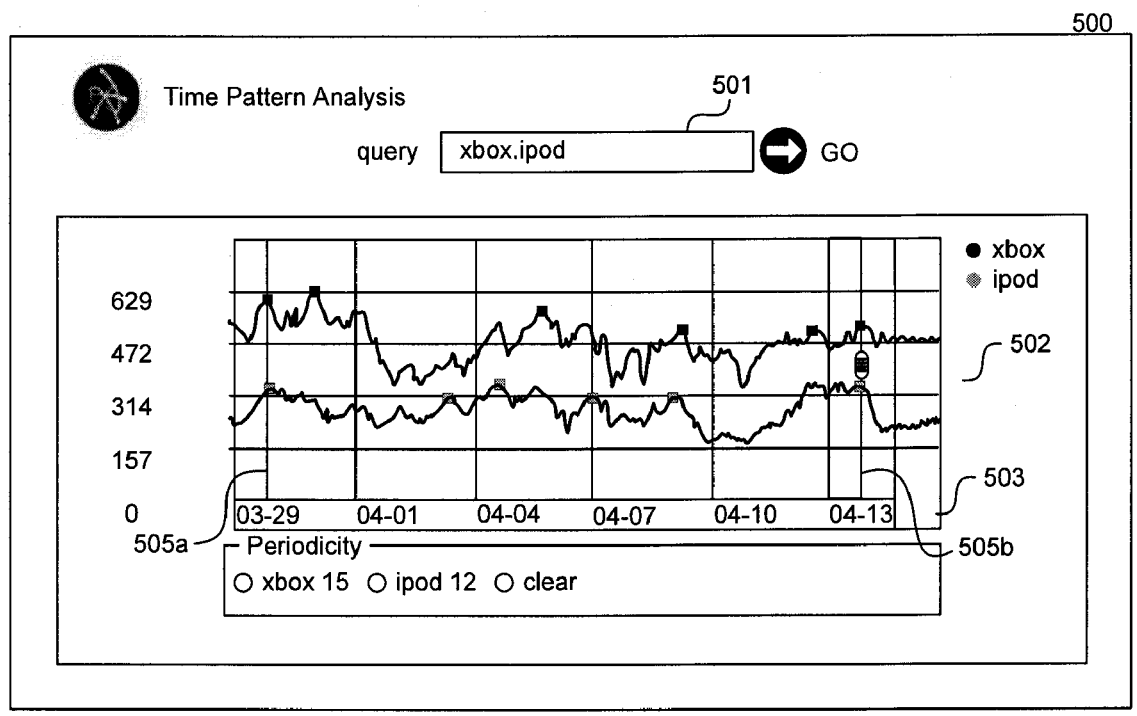
FIG. 5 illustrates a graph of past and predicted frequencies for multiple queries with clickthrough data.

FIG. 5 illustrates a graph of past and predicted frequencies for multiple queries with clickthrough data. A display page 500 includes a query field 501, a graph 502, and clickthrough data 506 for two queries. After a user enters a second query into the query field, the query analysis system generates and displays the graph of the frequency for both queries. The portion 503 indicates an interval for which the frequencies for the queries are predicted. The user may select an interval range 505a to 505b to display an indication of the clickthrough data 506 for each of the queries during that range of intervals.

Figure 6:
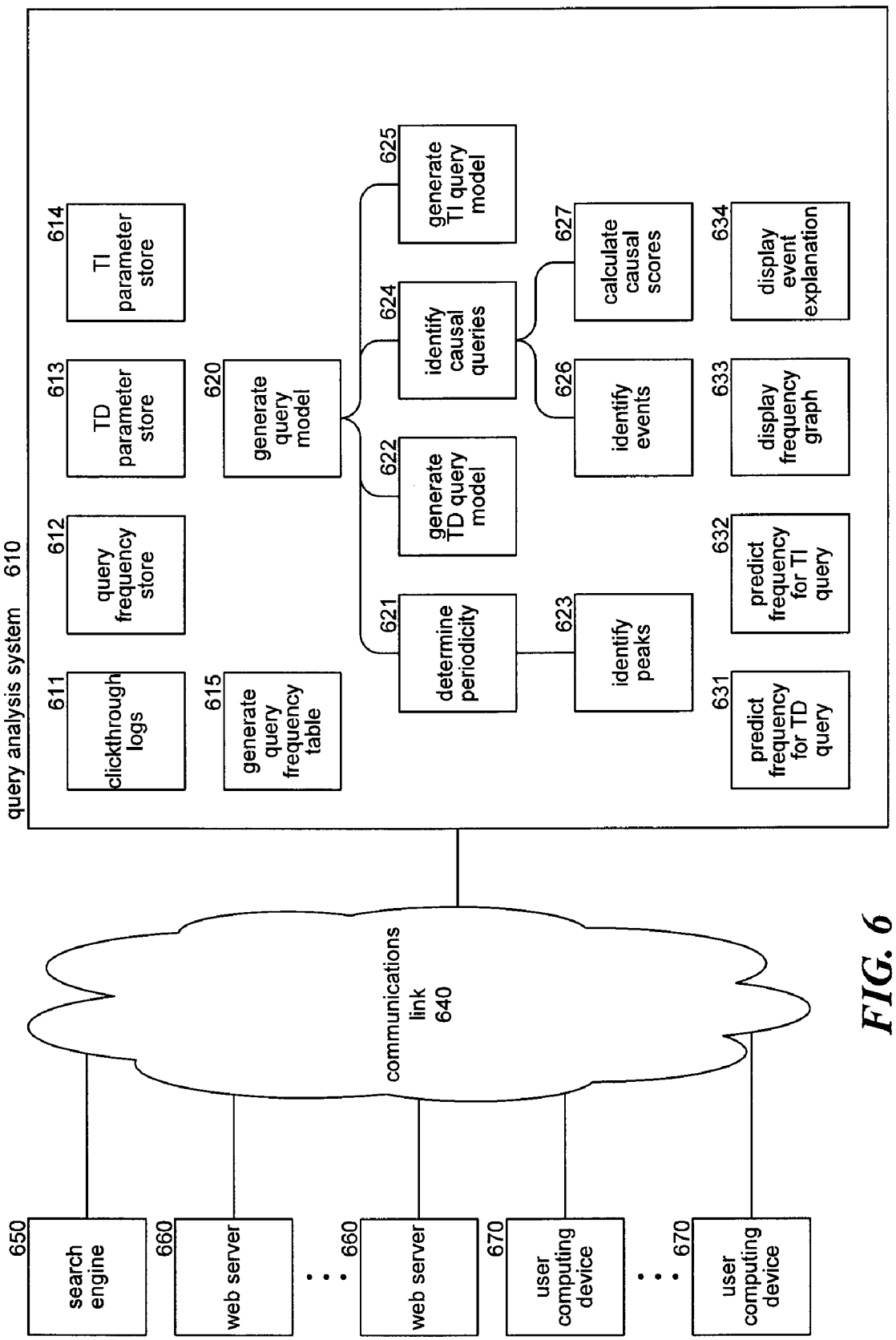
FIG. 6 is a block diagram that illustrates components of the query analysis system in some embodiments.

FIG. 6 is a block diagram that illustrates components of the query analysis system in some embodiments. The query analysis system 610 may be connected to a search engine 650, web servers 660, and user computing devices 670 via the communications link 640. The query analysis system includes various data stores including a clickthrough log store 611, a query frequency store 612, a time-dependent parameter store 613, and a time-independent parameter store 614. The clickthrough log store contains clickthrough data collected from the search engine. The query frequency store contains the frequency of each query at each interval. The time-dependent parameter store contains the parameters for each query for the time-dependent query model. The time-independent parameter store contains parameters for each query for the time-independent query model. The query analysis system also includes a generate query frequency table component 615 that analyzes the clickthrough logs and generates the data for the query frequency store.

The query analysis system includes a generate query model component 620 that controls the generating of the time-dependent query models and the time-independent query models. The generate query model component invokes a determine periodicity component 621 and a generate time-dependent query model component 622. The determine periodicity component generates the values of the frequency spectral for a query, invokes an identify peaks component 623 to identify the peaks within the frequency spectral, and determines the periodicities of the query. The generate time-dependent query model component generates the parameters for a time-dependent query model for a query and stores them in the time-dependent parameter store. The generate query model also invokes an identify causal queries component 624 and a generate time-independent query model component 625. The identify causal queries component identifies the candidate queries that are causally related to a target query by invoking an identify events component 626 and a calculate causal scores component 627. The identify events component identifies events within each query. The calculate causal scores component calculates the query causal score for a pair of queries. The identify causal queries component identifies the candidate queries. The generate time-independent query model component inputs the candidate queries and generates weights for the time-independent query model and stores an indication of the candidate queries and the weights as parameters in the time-independent parameter store.

The query analysis system also includes a predict frequency for time-dependent query component 631, a predict frequency for time-independent query component 632, a display frequency graph component 633, and a display event explanation component 634. The predict frequency for time-dependent query component inputs a query and predicts its frequency using a time-dependent query model (or prediction model). The predict frequency for time-independent query component inputs a query and predicts the frequency for that query using a time-independent query model. The display frequency graph component generates a graph for the past frequencies of a query and predicted frequencies that are predicted using either a time-dependent or time-independent query model. The display event explanation component analyzes the clickthrough data for a query and generates a report of the number of times that items of the search result for that query were selected by users.

The computing device on which the query analysis system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the query analysis system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The query analysis system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. In addition, the functions of the query analysis system may be performed offline. For example, the query analysis system may generate new query models on a periodic basis and store the parameters for use in real time. Also, the generating of the query model may be performed by computing devices separate from computing devices that use the parameters of the model.

Figure 7:
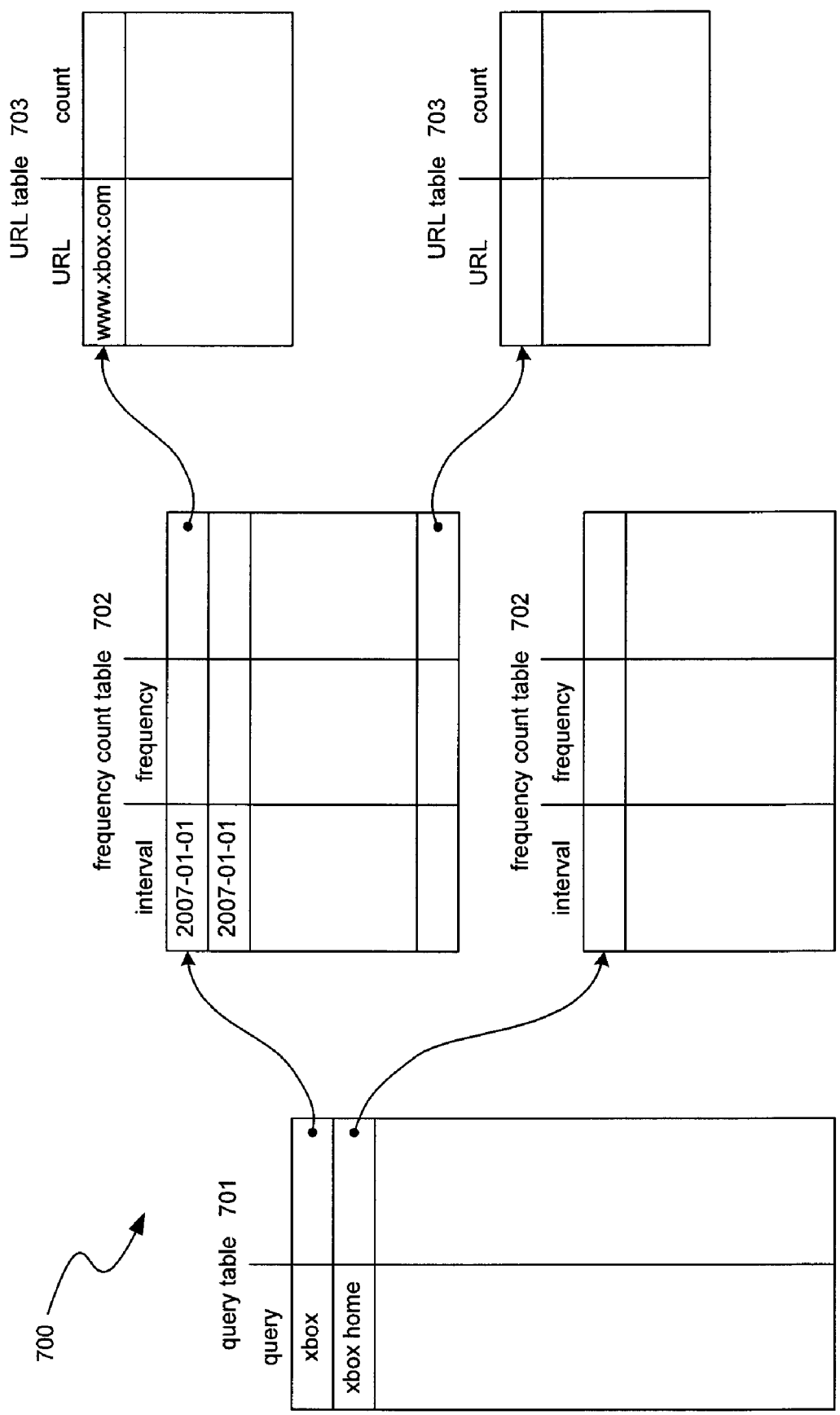
FIG. 7 is a block diagram that illustrates the logical organization of a data structure of the query frequency store in some embodiments.

FIG. 7 is a block diagram that illustrates the logical organization of a data structure of the query frequency store in some embodiments. A data structure 700 may include a query table 701 with an entry for each query of a clickthrough log. Each entry contains the query along with a reference to a frequency count table 702. A frequency count table contains an entry for each interval represented by the clickthrough log. Each entry contains an identification of the interval and the frequency of that query during that interval. Each entry also contains a reference to a URL table 703 that contains an entry for each item selected by the searchers from the search results of that query during the interval. Each entry contains the URL of the item selected along with the count of the number of times that the search result item was selected.

Figure 8:
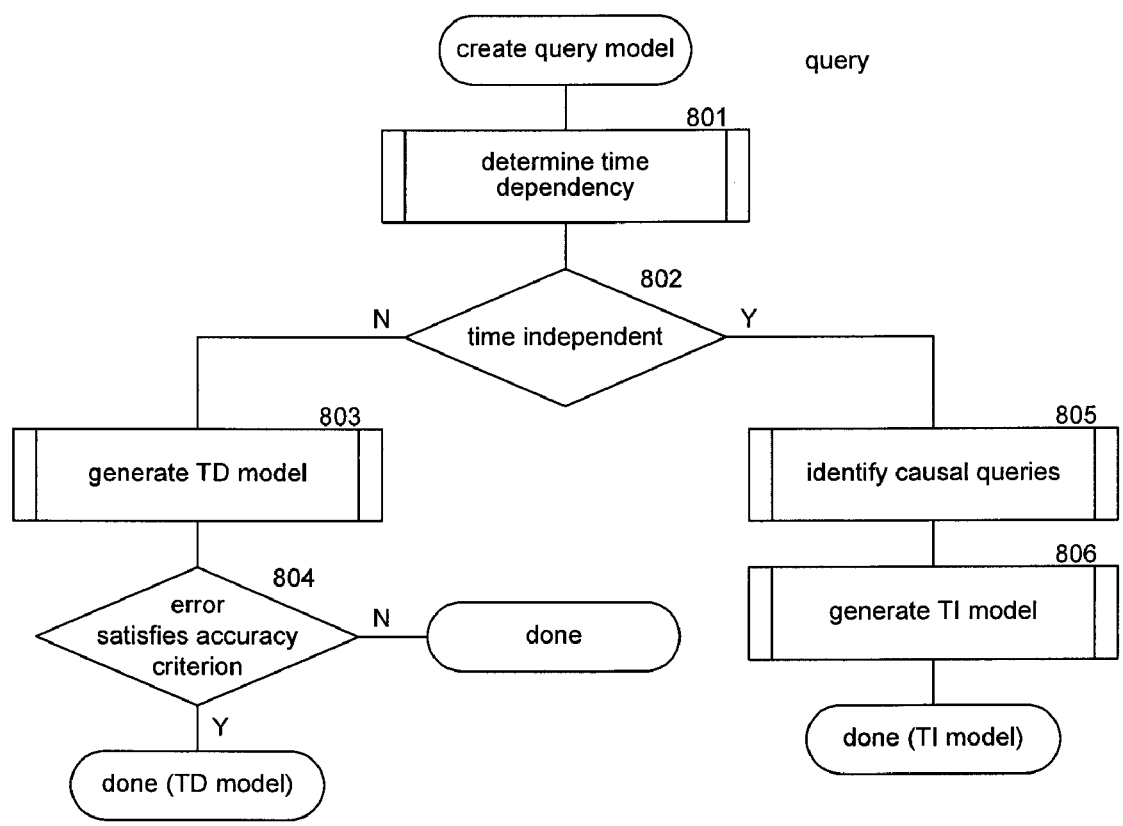
FIG. 8 is a flow diagram that illustrates the processing of a create query model component of the query analysis system in some embodiments.

FIG. 8 is a flow diagram that illustrates the processing of a create query model component of the query analysis system in some embodiments. The create query model component is invoked to determine the time dependency of a passed query and to generate a time-dependent query model or time-independent query model for the query. In block 801, the component invokes the determine time dependency component to determine the time dependency of the query. In decision block 802, if the query is time-independent, than the component continues at block 805, else the component continues at block 803. In block 803, the component invokes the generate time-dependent query model component to generate a time-dependent query model for the query. In decision block 804, if the error in the generated time-dependent query model satisfies an accuracy criterion, then the component returns an indication that the time-dependent query model is accurate, else the component returns an indication that the time-dependent query model is not accurate. In block 805, the component invokes the identify causal queries component to identify the candidate queries that are causally related to the query. In block 806, the component invokes the generate time-independent query model component to generate the time-independent query model for the query. One skilled in the art will appreciate that if the accuracy of a time-dependent query model for a query is not acceptable, then the query analysis system may generate a time-independent query model for that query.

Figure 9:
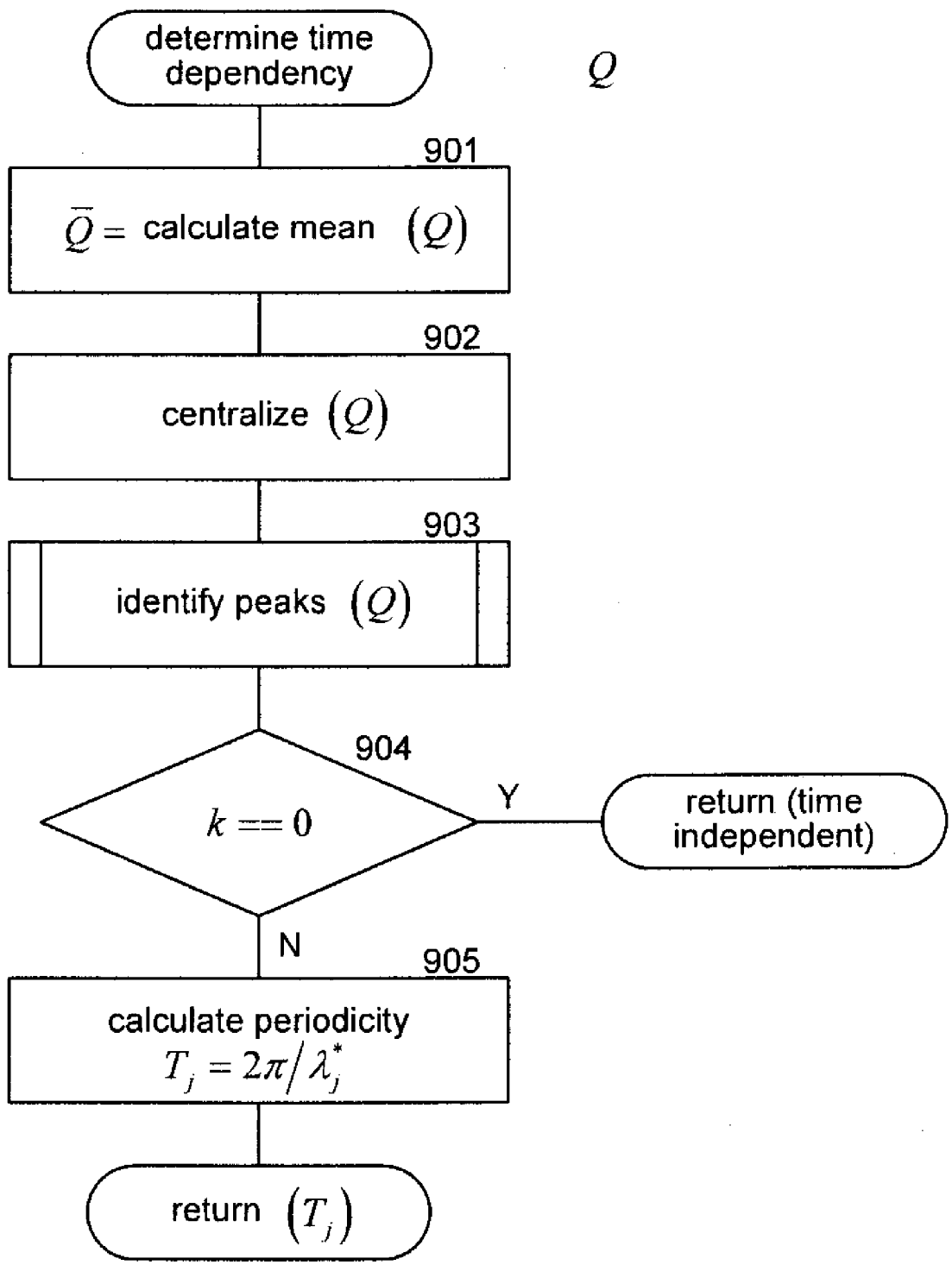
FIG. 9 is a flow diagram that illustrates the processing of a determine time dependency component of the query analysis system in some embodiments.

FIG. 9 is a flow diagram that illustrates the processing of a determine time dependency component of the query analysis system in some embodiments. The component is passed a query and determines whether the query is time-dependent or time-independent. If the query is time-dependent, then the component returns the periodicities of the query. In block 901, the component calculates the mean frequency of the query. In block 902, the component centralizes the frequencies of the query by subtracting the mean frequency from each frequency. In block 903, the component invokes the identify peaks component to identify peaks within the frequency spectral of the query. In decision block 904, if no peaks were detected, then the component returns an indication that the query is time-independent, else the component continues at block 905. In block 905, the component calculates the periodicity for each peak and then returns the periodicities along with an indication that the query is time-dependent.

Figure 10:
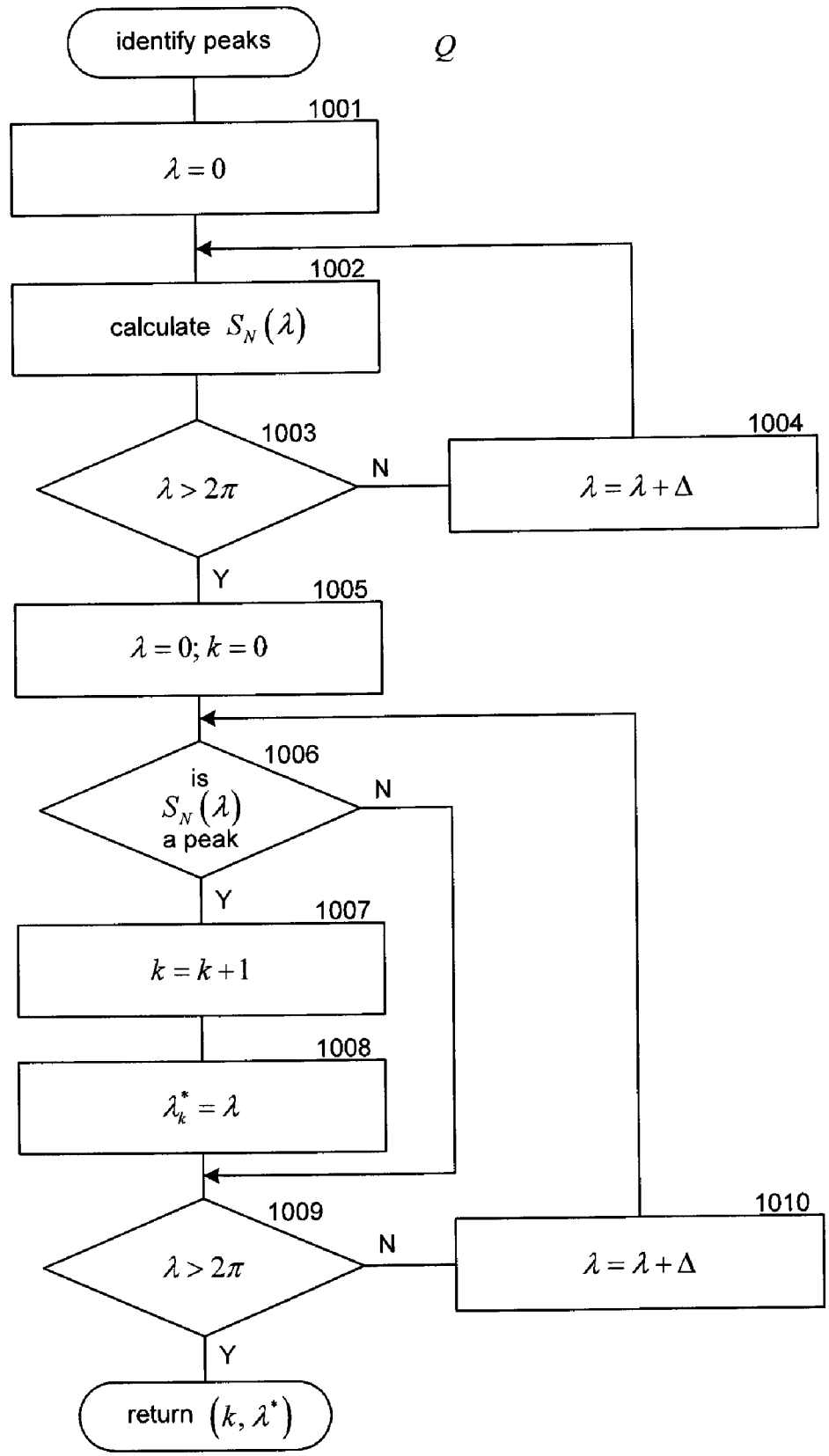
FIG. 10 is a flow diagram that illustrates the processing of the identify peaks component of the query analysis system in some embodiments.

FIG. 10 is a flow diagram that illustrates the processing of the identify peaks component of the query analysis system in some embodiments. The identify peaks component is passed a query and identifies peaks within the frequency spectral of that query. In blocks 1001-1004, the component loops calculating a value of frequency spectral for various angular frequencies. In block 1001, the component initializes the angular frequency. In block 1002, the component calculates the value for the frequency spectral for the selected angular frequency. In decision block 1003, if all the angular frequencies have already been selected, then the component continues at block 1005, else the component continues at block 1004. In block 1004, the component selects the next angular frequency and then loops to block 1002 to calculate the corresponding value at that angular frequency. In blocks 1005-1010, the component loops identifying peaks. In block 1005, the component initializes the angular frequency and count of the number of peaks. In decision block 1006, if the value of the frequency spectral corresponding to the selected angular frequency is a peak, then the component continues at block 1007, else the component continues at block 1009. In block 1007, the component increments the number of peaks. In block 1008, the component sets the angular frequency of the peak. In decision block 1009, if all the angular frequencies have already been selected, then the component returns an indication of the number of peaks and the corresponding angular frequencies, else the component continues at block 1010. In block 1010, the component selects the next angular frequency and then loops to block 1006 to identify a peak.

Figure 11:
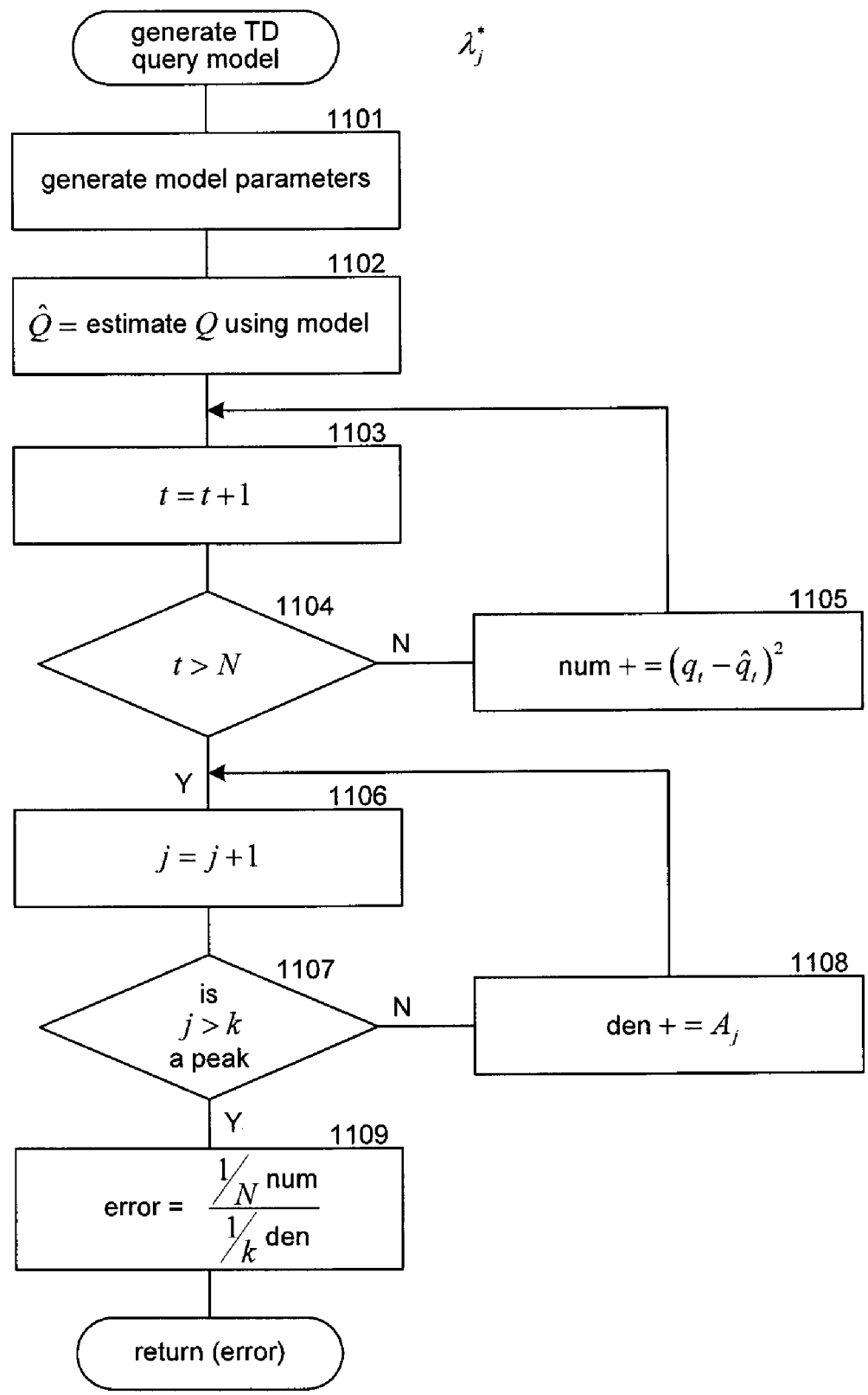
FIG. 11 is a flow diagram that illustrates the processing of the generate time-dependent query model component of the query analysis system in some embodiments.

FIG. 11 is a flow diagram that illustrates the processing of the generate time-dependent query model component of the query analysis system in some embodiments. The component is passed an indication of the angular frequencies of the peaks and generates and evaluates the accuracy of the model. In block 1101, the component generates the model parameters for each peak according to Equation 6. In block 1102, the component uses the model parameters to predict the frequency of the query at each interval for which the actual frequency was collected. In blocks 1103-1105, the component loops calculating the square of the differences between the actual frequency and the predicted frequency. In block 1103, the component selects the next interval. In decision block 1104, if all the intervals have already been selected, then the component continues at block 1106, else the component continues at block 1105. In block 1105, the component generates a running sum of the square of the differences and then loops to block 1103 to select the next interval. In blocks 1106-1108, the component loops aggregating the amplitude of the angular frequency for each peak. In block 1106, the component selects the next peak. In decision block 1107, if all the peaks have already been selected, then the component continues at block 1109, else the component continues at block 1108. In block 1108, the component accumulates the amplitude of the angular frequency and then loops to block 1106 to select the next peak. In block 1109, the component calculates the error according to Table 1. The component then returns an indication of the error.

Figure 12:
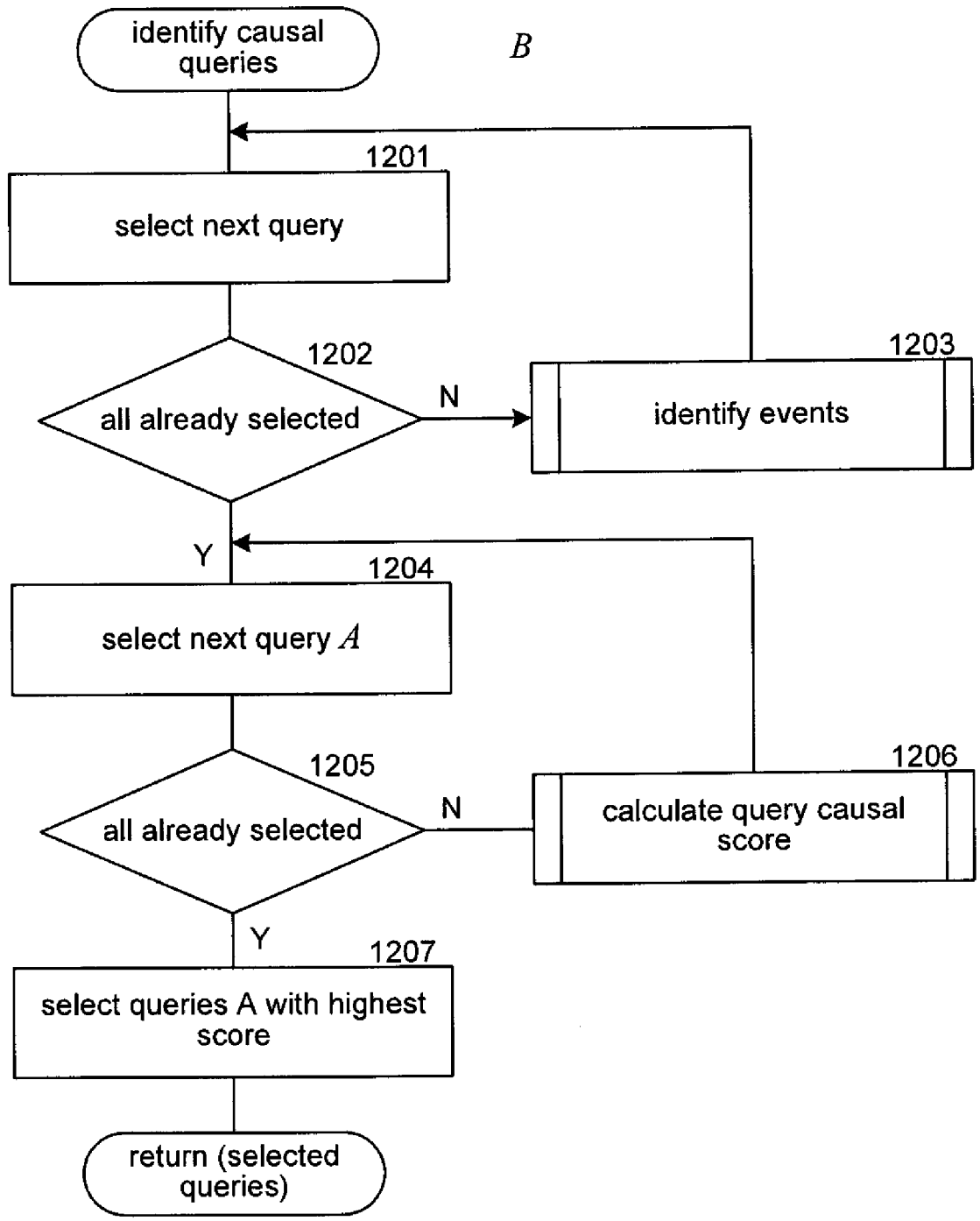
FIG. 12 is a flow diagram that illustrates the processing of an identify causal queries component of the query analysis system in some embodiments.

FIG. 12 is a flow diagram that illustrates the processing of an identify causal queries component of the query analysis system in some embodiments. The component is passed a query and identifies candidate queries that are causally related to the query. In blocks 1201-1203, the component loops identifying events of each query. In block 1201, the component selects the next query. In decision block 1202, if all the queries have already been selected, then the component continues at block 1204, else the component continues at block 1203. In block 1203, the component invokes the identify events component to identify the events for the selected query and then loops to block 1201 to select the next query. The query analysis system represents each query by the sequence of its events. In blocks 1204-1206, the component loops calculating a query causal score for each query indicating its causal relatedness to the target query. In block 1204, the component selects the next query. In decision block 1205, if all the queries have already been selected, then the component continues at block 1207, else the component continues at block 1206. In block 1206, the component invokes a calculate query causal score component to generate a query causal score for the selected query and the target query. The component then loops to block 1204 to select next query. In block 1207, the component selects the queries with the highest scores as the candidate queries. The component then returns the selected queries.

Figure 13:
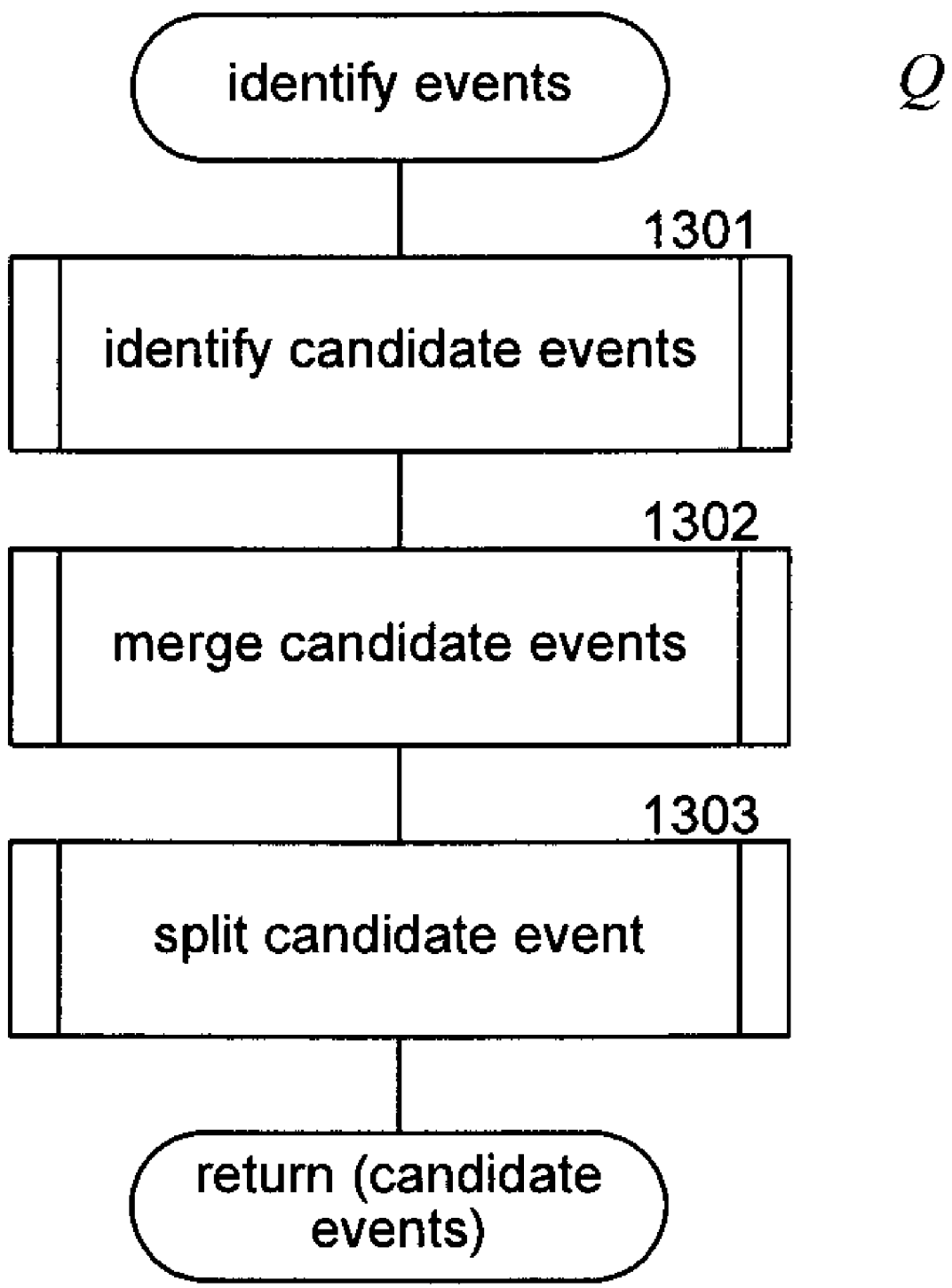
FIG. 13 is a flow diagram that illustrates the processing of the identify events component of the query analysis system in some embodiments.

FIG. 13 is a flow diagram that illustrates the processing of the identify events component of the query analysis system in some embodiments. The component is passed a query and identifies the events within the query. In block 1301, the component invokes the identify candidate events component to calculate the candidate events using a 3σ rule of Gaussian distribution. In block 1302, the component invokes the merge candidate events component to merge candidate events that overlap significantly. In block 1303, the component invokes the split candidate events component to split candidate events that have climaxes that are separated by deep valleys. The component then returns the candidate events as the event for the query.

Figure 14:
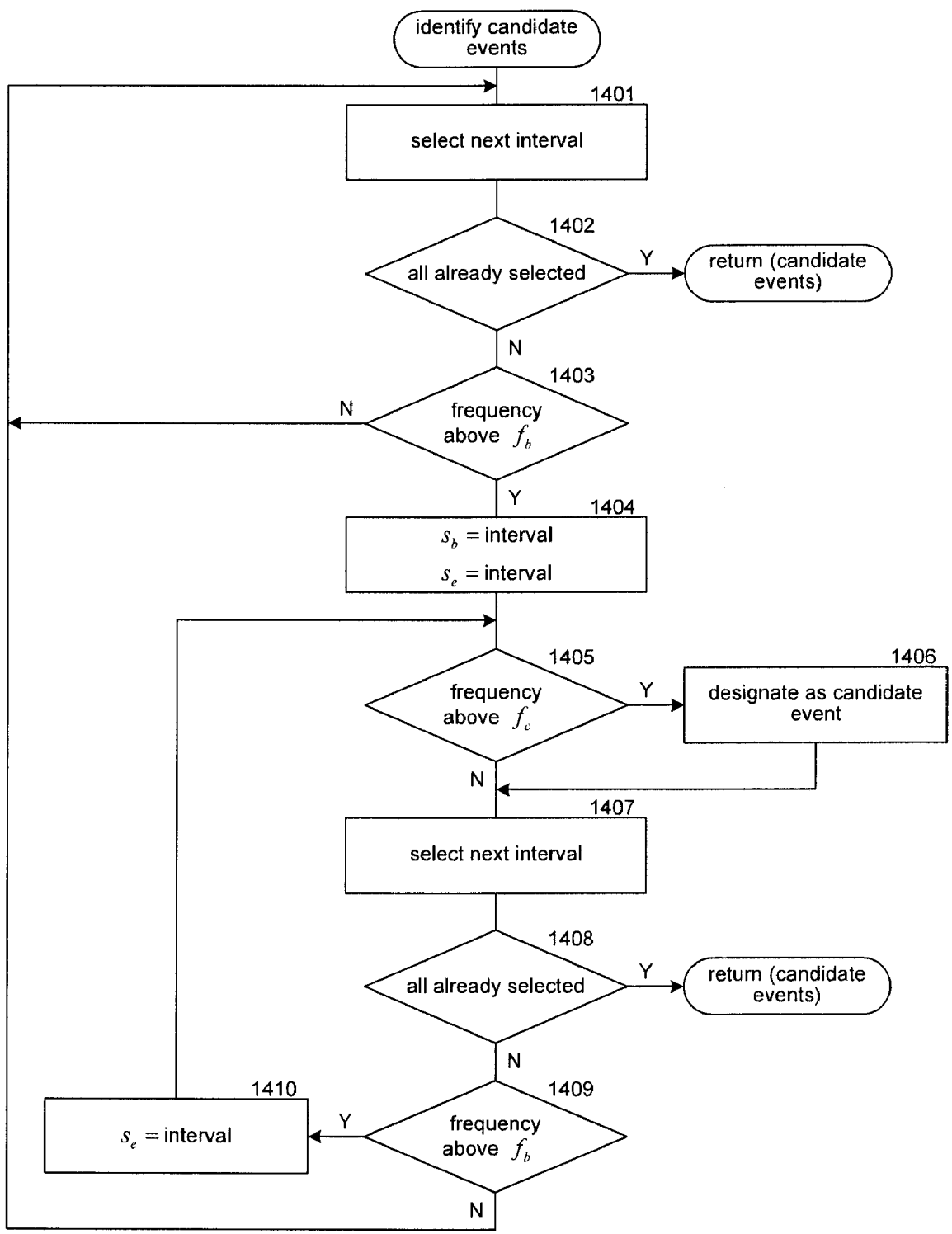
FIG. 14 is a flow diagram that illustrates the processing of the identify candidate events component of the query analysis system in some embodiments.

FIG. 14 is a flow diagram that illustrates the processing of the identify candidate events component of the query analysis system in some embodiments. The component identifies candidate events as a sequence of intervals with frequencies above a baseline threshold with at least one frequency above a climax threshold. In some embodiments, the baseline threshold is a frequency that is greater than the mean frequency of the query by one standard deviation, and the climax threshold is greater than the mean frequency by three standard deviations assuming a Gaussian distribution. One skilled in the art will appreciate that other baseline and climax criteria may be used. In blocks 1401-1410, the component loops selecting each interval of the query and determining whether a sequence of intervals is a candidate event. In block 1401, the component selects the next interval. In decision block 1402, if all the intervals have already been selected, then the component returns the designated candidate events, else the component continues at block 1403. In decision block 1403, if the frequency of the selected interval is above the baseline threshold, then the component has detected the start of a sequence of interval above the baseline threshold and continues at block 1404, else the component loops to block 1401 to select the next interval. In block 1404, the component sets the start and end of what may be designated as a candidate event to the selected interval. In blocks 1405-1410, the component loops identifying at the sequence of intervals whose frequencies are above the baseline threshold and determining whether any of the frequencies above the climax threshold. In decision block 1405, if the frequency of the selected interval is above the climax threshold, then the component continues at block 1406, else the component continues at block 1407. In block 1406, the component designates the sequence of intervals as being a candidate event. In block 1407, the component selects the next interval. In decision block 1408, if all the intervals for the query have already been selected, then the component returns the candidate events, else the component continues at block 1409. In decision block 1409, if the frequency for the selected interval is above the baseline threshold, then the component continues at block 1410, else the component loops to block 1401 to select the next interval. In block 1410, the component adjusts the end of the sequence of intervals that are above the baseline threshold to the currently selected interval and then loops to block 1405 to select the next interval.

Figure 15:
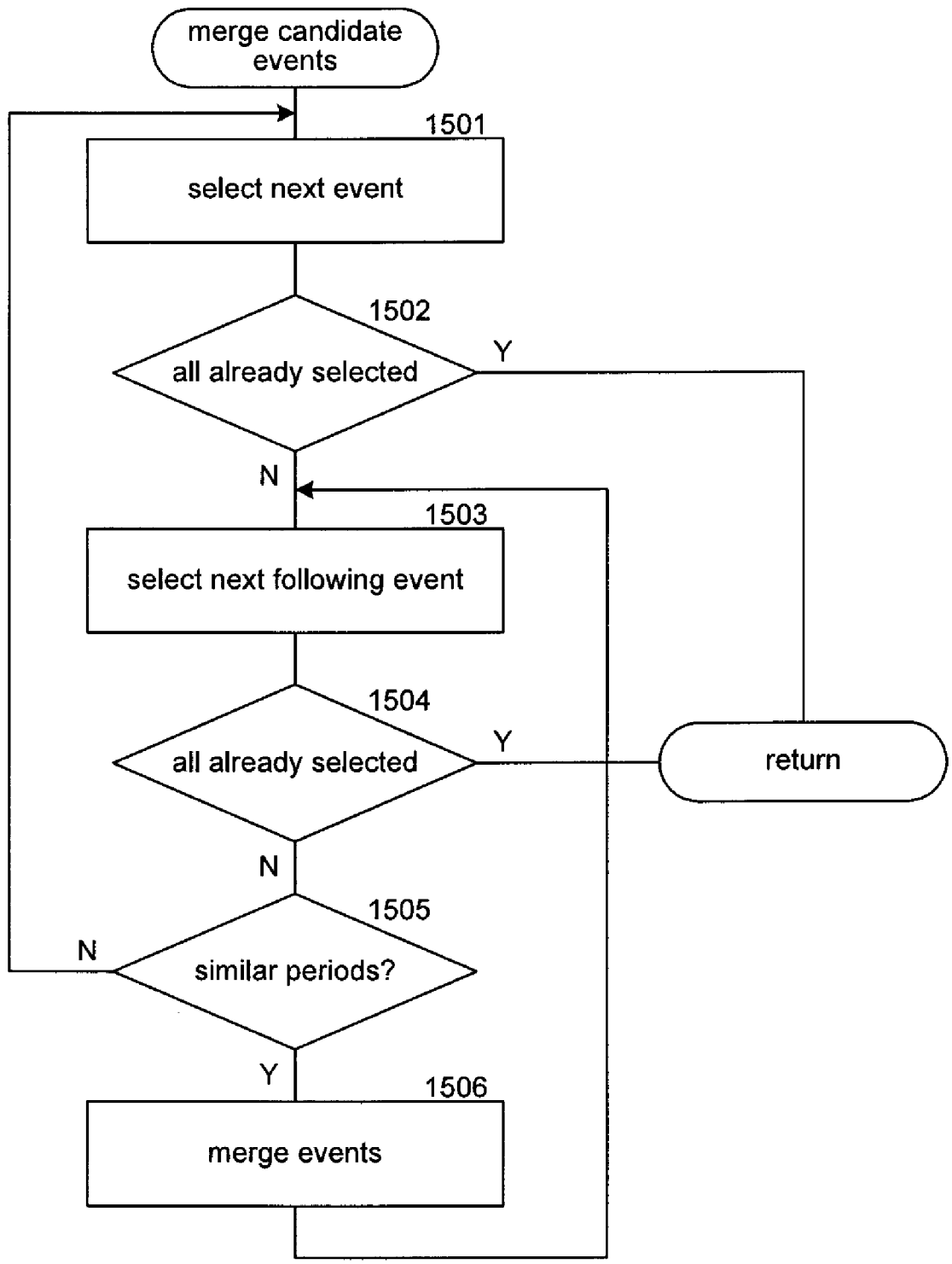
FIG. 15 is a flow diagram that illustrates the processing of the merge candidate events component of the query analysis system in some embodiments.

FIG. 15 is a flow diagram that illustrates the processing of the merge candidate events component of the query analysis system in some embodiments. The component is passed candidate events and merges the candidate events when they satisfy a merge events criterion such as that the sequence of their intervals overlaps significantly. In block 1501, the component selects the next candidate event. In decision block 1502, if all the candidate events have already been selected, then the component returns, else the component continues at block 1503. In block 1503, the component selects the next candidate event following the selected event. In decision block 1504, if all the next following events have already been selected, then the component returns, else the component continues at block 1505. In block 1505, if the selected event and the selected following events satisfy a merge events criterion, then the component continues at block 1506, else the component loops to block 1501 to select the next event. In block 1506, the component merges the selected event and the selected following event and then loops to block 1503 to select the next following event.

Figure 16:
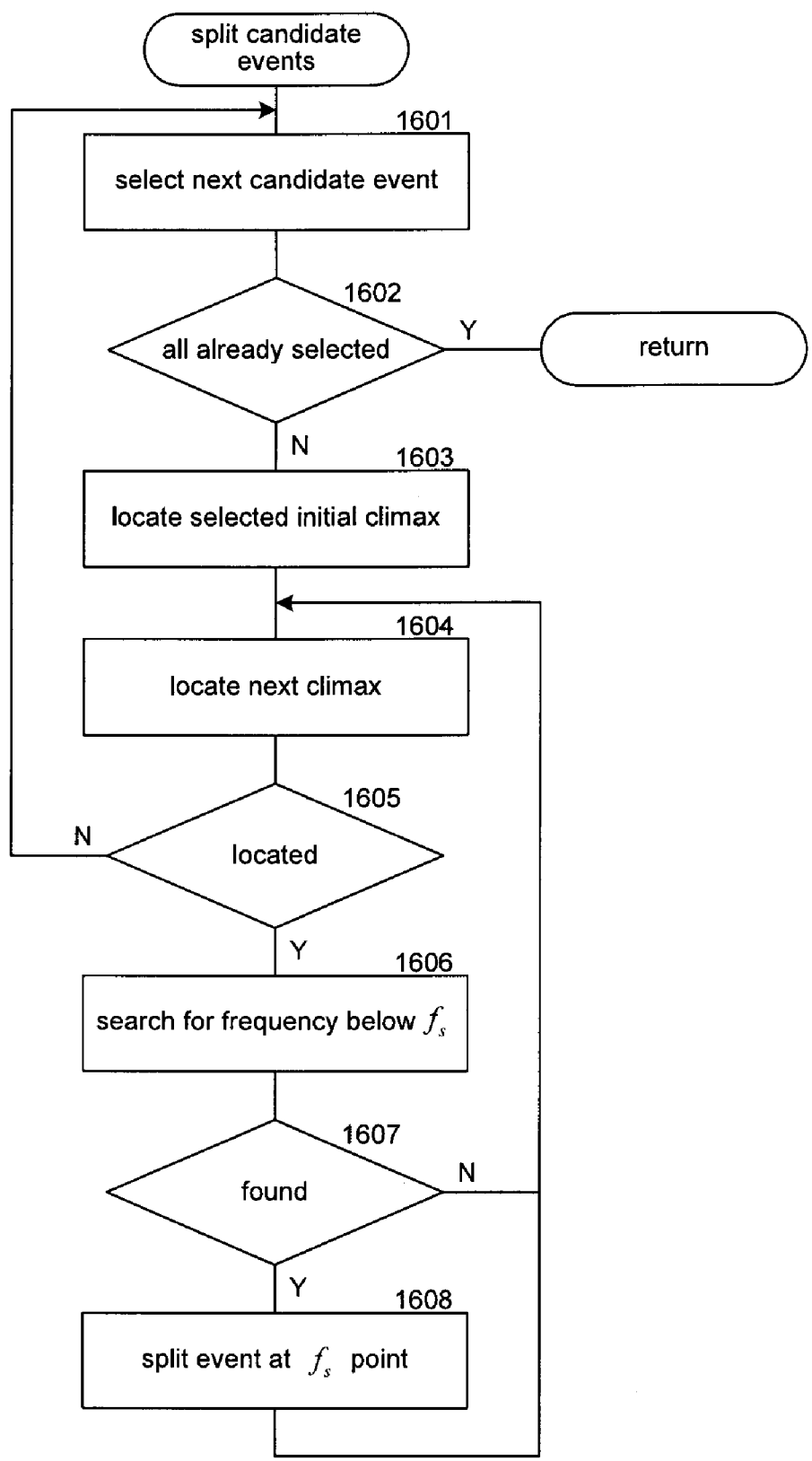
FIG. 16 is a flow diagram that illustrates the processing of the split candidate events component of the query analysis system in some embodiments.

FIG. 16 is a flow diagram that illustrates the processing of the split candidate events component of the query analysis system in some embodiments. The component checks each candidate event to determine whether it should be split into multiple candidate events. In block 1601, the component selects the next candidate event. In decision block 1602, if all the candidate events have already been selected, then the component returns, else the component continues at block 1603. In block 1603, the component locates the initial climax of the selected candidate event. In blocks 1604-1608, the component loops locating the next climax of the selected event and determining whether it should be split. In block 1604, the component locates the next climax of the selected candidate event. In decision block 1605, if all the climaxes of the selected event have already been located, then the component loops to block 1601 to select the next event, else the component continues at block 1606. In block 1606, the component searches for a frequency between the selected climax and the next climax that satisfies a split event criterion. For example, the split event criterion may be satisfied when a frequency is below a threshold frequency indicating a deep valley of frequencies between the climaxes. In decision block 1607, if the split event criterion is satisfied, then the component continues at block 1608 to split the event. The component then loops to block 1604 to select the next climax.

Figure 17:
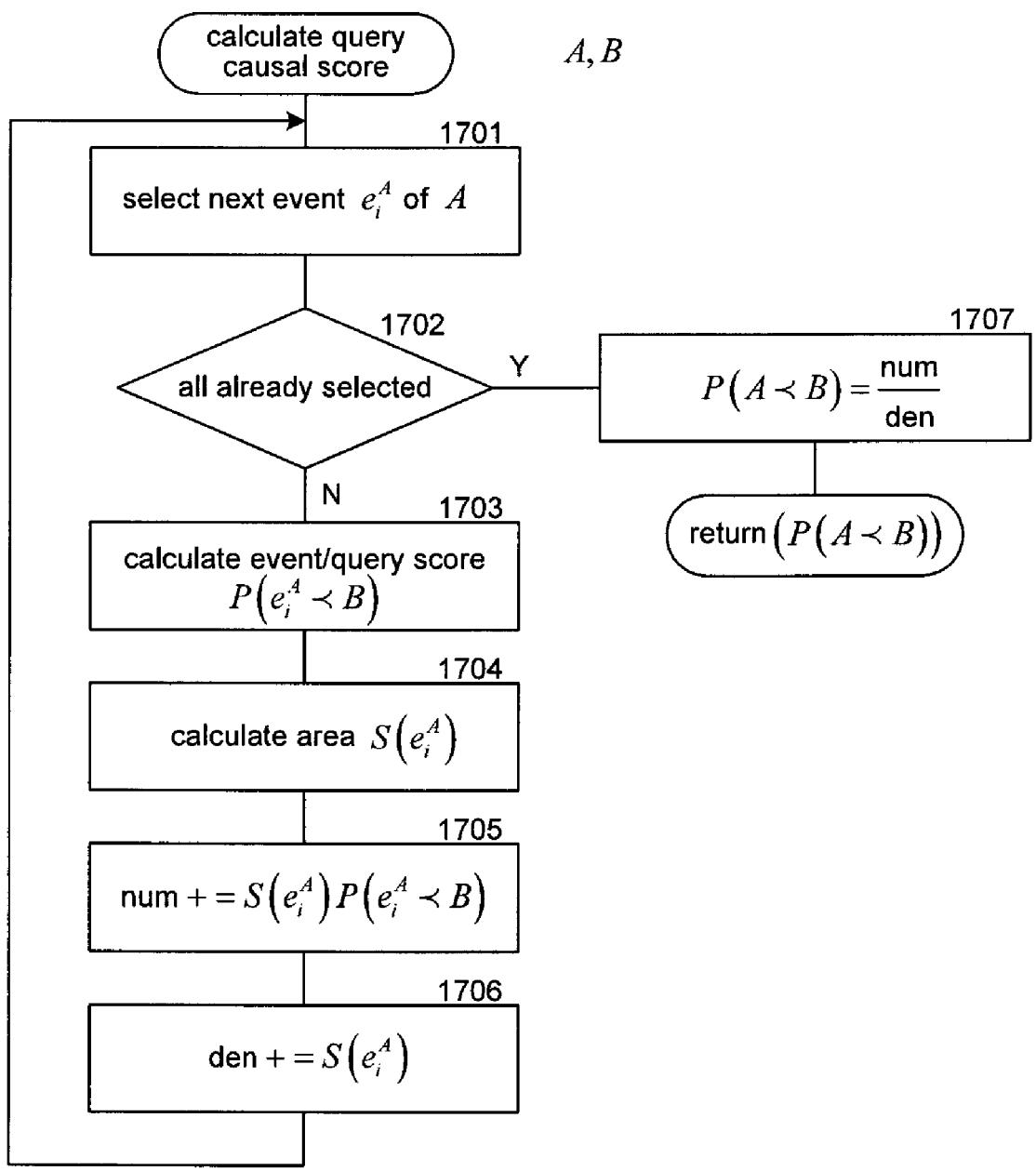
FIG. 17 is a flow diagram that illustrates the processing of the calculate query causal score component of the query analysis system in some embodiments.

FIG. 17 is a flow diagram that illustrates the processing of the calculate query causal score component of the query analysis system in some embodiments. The component is passed a pair of queries and calculates a score indicating that the first query of the pair causally precedes the second query of the pair. In block 1701, the component selects the next event of the first query. In decision block 1702, if all the events of the first query have already been selected, then the component continues at block 1707, else the component continues at block 1703. In block 1703, the component invokes a calculate event/query score component to generate a score indicating likelihood that the event causes events of the second query. In block 1704, the component calculates the area of the selected event. In block 1705, the component accumulates a numerator for generating the query causal score. In block 1706, the component accumulates a denominator for calculating the query causal score and then loops to block 1701 to select the next event. In block 1707, the component divides the numerator by the denominator to generate the query causal score and returns that score.

Figure 18:
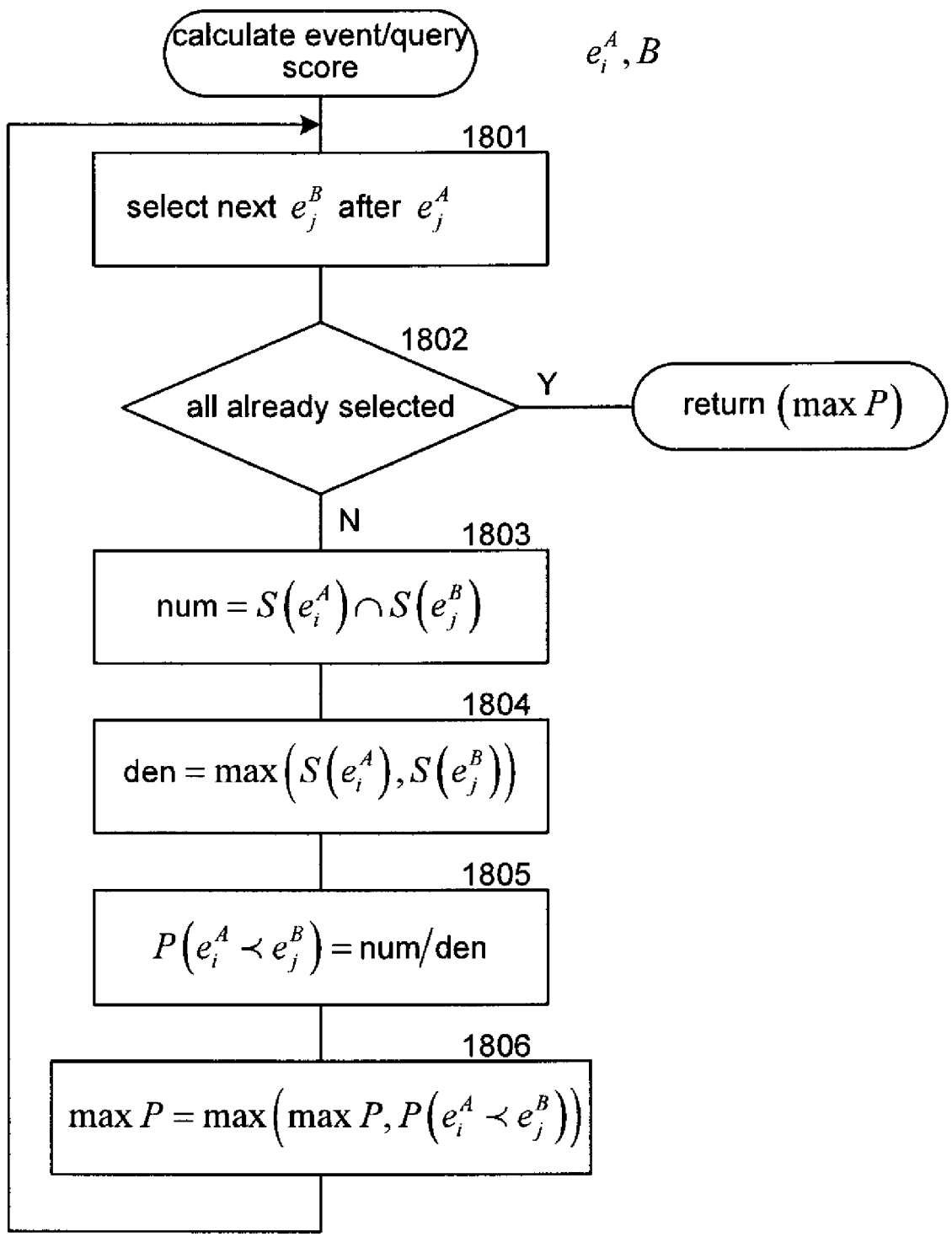
FIG. 18 is a flow diagram that illustrates the processing of the calculate event/query score component of the query analysis system in some embodiments.

FIG. 18 is a flow diagram that illustrates the processing of the calculate event/query score component of the query analysis system in some embodiments. The component is passed an event and a query and generates a score indicating whether the event is a causal event of the query. In block 1801, the component selects the next event of the query that is after the passed event. In decision block 1802, if all such events have already been selected, then the component returns the maximum event causal score, else the component continues at block 1803. In block 1803, the component sets a numerator for calculating an event causal score based on the area of the events. In block 1804, the component sets a denominator to the maximum of the area of a passed event or the selected event. In block 1805, the component calculates the event causal score by dividing the numerator by the denominator. In block 1806, the component updates the event/query score to be the maximum of the event causal scores calculated so far. The component then loops to block 1801 to select the next event of the query.

Figure 19:
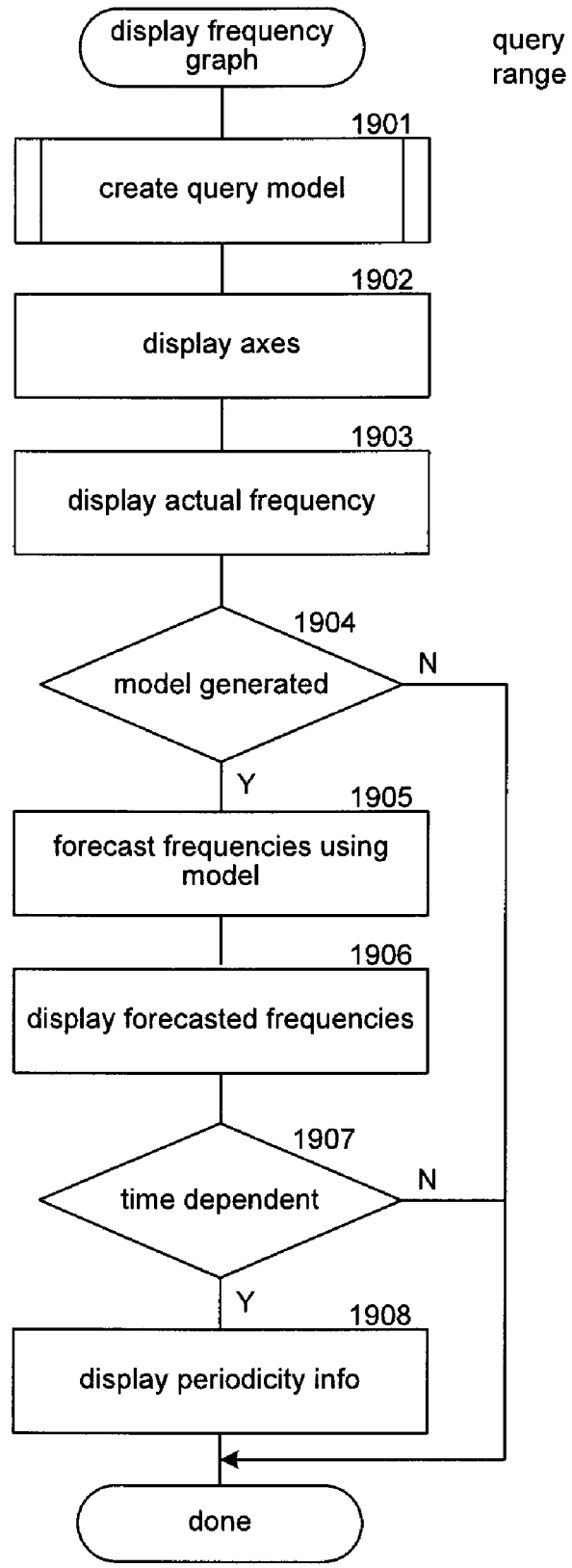
FIG. 19 is a flow diagram that illustrates the processing of a display frequency graph component of the query analysis system in some embodiments.

FIG. 19 is a flow diagram that illustrates the processing of a display frequency graph component of the query analysis system in some embodiments. The component is passed a query and a range of intervals and displays a graph of past and predicted frequencies for the query. In block 1901, the component invokes the create query model to create either a time-dependent query model or time-independent query model for the query. In block 1902, the component displays the axes of the graph. In block 1903, the component displays a graph of the actual frequencies. In decision block 1904, if a model was generated, then the component continues at block 1905, else the component completes. In block 1905, the component predicts frequencies using the model. In block 1906, the component displays the predicted frequencies. In decision block 1907, if the model is a time-dependent query model, then the component displays periodicity information of the query in block 1908. The component then completes.

Figure 20:
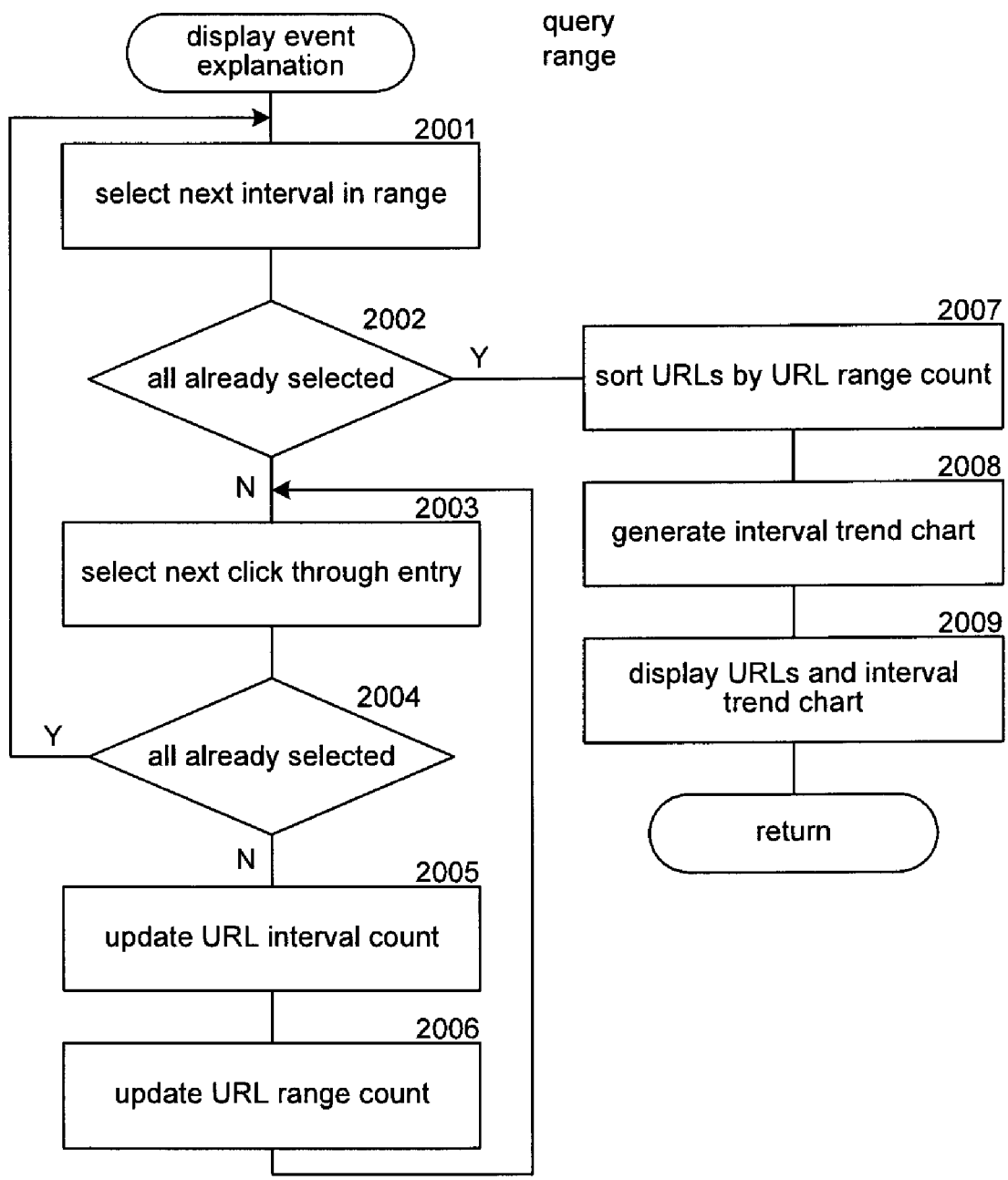
FIG. 20 is a flow diagram that illustrates the processing of the display event explanation component of the query analysis system in some embodiments.

FIG. 20 is a flow diagram that illustrates the processing of the display event explanation component of the query analysis system in some embodiments. The display event explanation component receives a query and an interval range and displays a list of the top URLs selected by searchers using that query during the range. In block 2001, the component selects the next interval in the range. In decision block 2002, if all the intervals have already been selected, then the component continues at block 2007, else the component continues at block 2003. In block 2003, the component selects the next clickthrough entry. In decision block 2004, if all the clickthrough entries have already been selected for the selected interval, then the component loops to block 2001 to select the next interval, else the component continues at block 2005. In block 2005, the component updates the URL interval count for the URL of the selected entry. In block 2006, the component updates a URL count for the entire range for the URL of the selected entry and then loops to block 2003 to select the next clickthrough entry. In block 2007, the component sorts the URLs by count. In block 2008, the component generates an interval trend chart indicating how the frequency of each item changes at each interval. In block 2009, the component displays an indication of the URLs and interval trend chart and returns.

Figure 21:
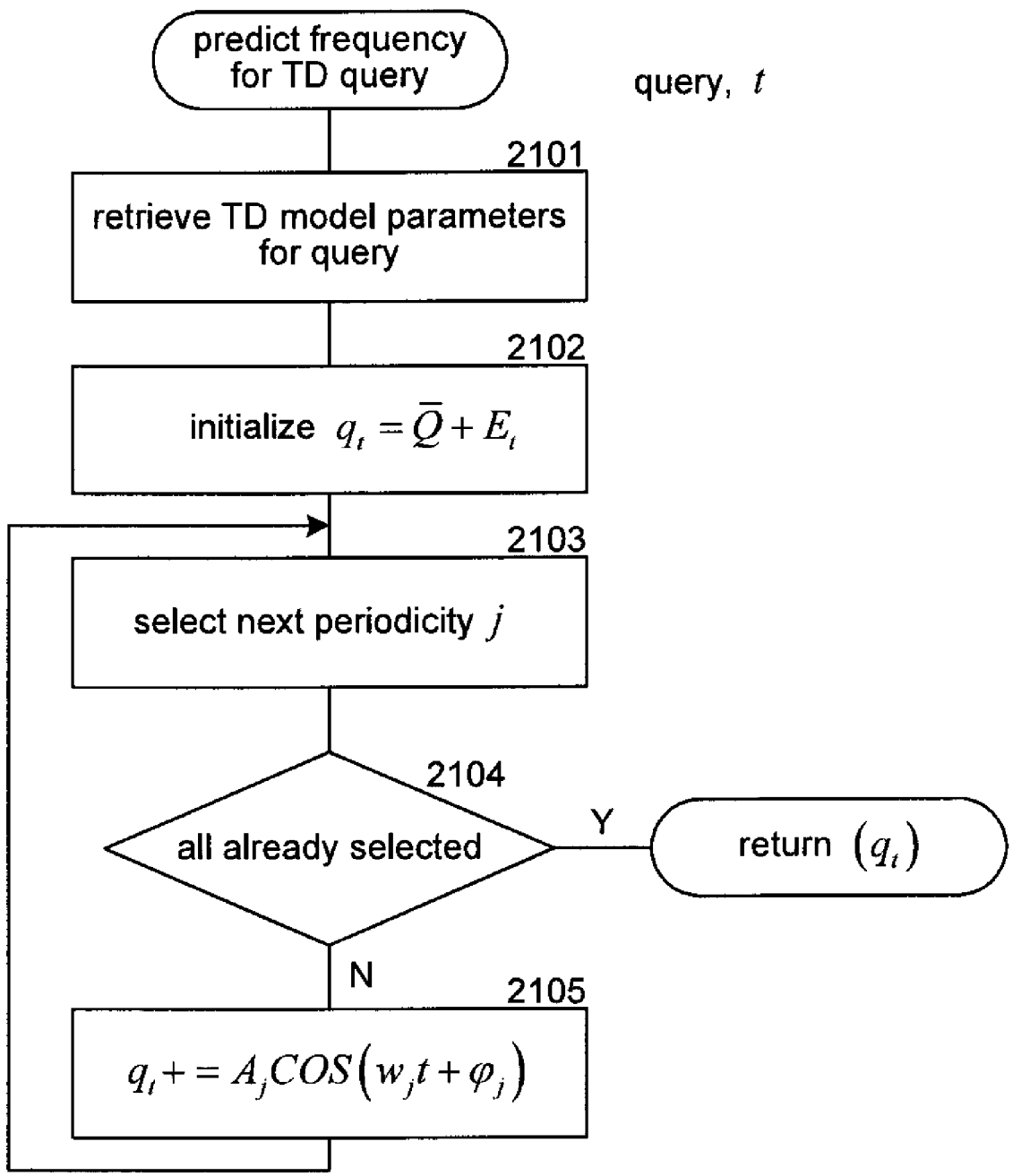
FIG. 21 is a flow diagram that illustrates the processing of the predict frequency for time-dependent query component of the query analysis system in some embodiments.

FIG. 21 is a flow diagram that illustrates the processing of the predict frequency for time-dependent query component of the query analysis system in some embodiments. The component is passed a query and an indication of a time interval. In block 2101, the component retrieves parameters for the time-dependent query model for the query. In block 2102, the component initializes the query frequency to the mean query frequency plus any background noise. In blocks 2103-2105, the component loops selecting the next periodicity and accumulating the frequencies for each periodicity. In block 2103, the component selects the next periodicity for the query. In decision block 2104, if all the periodicities have already been selected, then the component returns the frequency of the query, else the component continues at block 2105. In block 2105, the component aggregates the frequency for the selected periodicity based on Equation 1.

Figure 22:
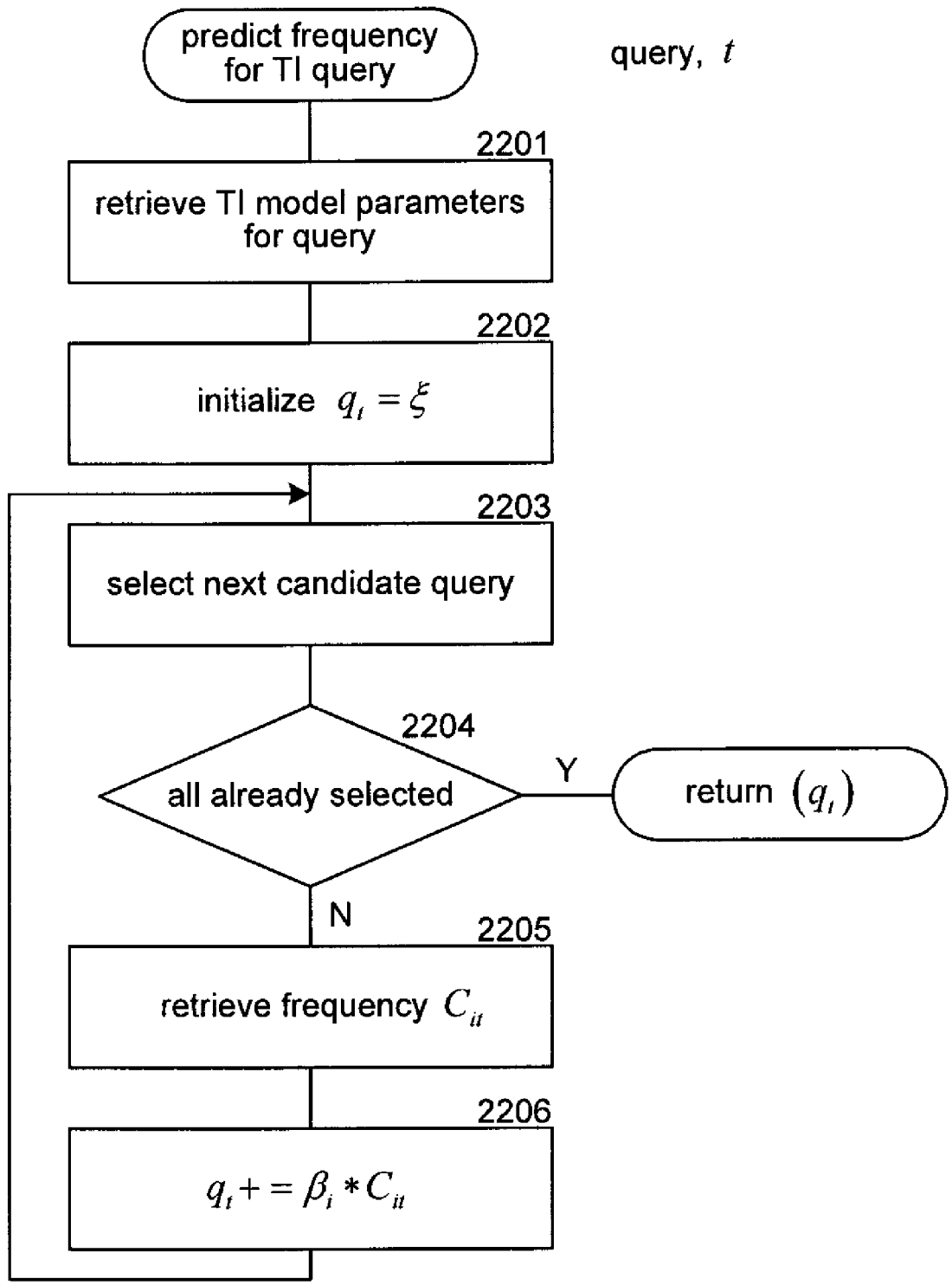
FIG. 22 is a flow diagram that illustrates the processing of the predict frequency for time-independent query component of the query analysis system in some embodiments.

FIG. 22 is a flow diagram that illustrates the processing of the predict frequency for time-independent query component of the query analysis system in some embodiments. The component is passed a query and an interval and predicts the frequency of that query at that interval using a time-independent query model. In block 2201, the component retrieves the parameters for the time-independent model for the query. In block 2202, the component initializes the frequency for the query based on background noise. In block 2203, the component selects the next candidate query of the model. In decision block 2204, if all the candidate queries have already been selected, then the component returns the frequency of the query, else the component continues at block 2205. In block 2205, the component retrieves the frequency for the selected candidate query at the interval. In block 2206, the component accumulates the weighted sum of the candidate frequencies and then loops to block 2203 to select the next candidate query.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for analyzing time dependency of a query, the method comprising:
storing frequency of the query at each of a plurality of intervals, the frequency for an interval indicating number of times the query was submitted during that interval;
calculating by the computing device values of a frequency spectral for each of a plurality of angular frequencies of the query based on the stored frequency of the queries at each of the plurality of intervals based on the following equation:

$$S_N(\lambda) = \sum_{t=1}^{N} q_t e^{-i\lambda t} \lambda \in [-\pi, \pi]$$

where $S_N(\lambda)$ represents a value of the spectral frequency for the angular frequency $\lambda$, $q_t$ represents the frequency for interval t, and N represents the number of intervals in the plurality of intervals;
determining by the computing device whether the values of the frequency spectral include peaks wherein a peak is a locally maximum value of the frequency spectral within a range with a property as represented by the following:

$$S_N(\lambda_j) \geq S_N(\lambda),$$

$$\text{where } \lambda \in \left[\lambda_j - \frac{1}{2\sqrt{N}}, \lambda_j + \frac{1}{2\sqrt{N}}\right];$$

and
after determining that the values of the frequency spectral include no peaks, indicating that the query is time-independent; and
after determining that the values of the frequency spectral include a peak, indicating that the query is time-dependent; and
calculating the periodicities of the query based on the following equation:

$$T_j = 2\pi/\lambda_j$$

where $T_j$ represents the periodicity corresponding to the peak at angular frequency $\lambda_j$
wherein time dependency of the query based on the determination of whether the frequency spectral includes peaks.

2. The method of claim 1 wherein the query is a query submitted to a search engine service and the stored frequency for an interval represents the number of times the query was submitted to the search engine service during that interval.

3. A computer-readable storage medium encoded with instructions for controlling a computing device to determine time dependency of a query, by a method comprising:
calculating a value of a frequency spectral for each of a plurality of angular frequencies of the query based on the following equation:

$$S_N(\lambda) = \sum_{t=1}^{N} q_t e^{-i\lambda t} \lambda \in [-\pi, \pi]$$

where $S_N(\lambda)$ represents a value of the spectral frequency for an angular frequency $\lambda$, $q_t$ represents a frequency for an interval t, and N represents the number of intervals;
determining whether the values of the frequency spectral include peaks wherein a peak is a locally maximum value of the frequency spectral within a range;
when it is determined that the frequency spectral includes no peak, indicating that the query is time-independent; and
when it is determined that the frequency spectral includes one or more peaks, indicating that the query is time-dependent.

4. The computer-readable storage medium of claim 3 wherein a peak is a locally maximum value of the frequency spectral.

5. The computer-readable storage medium of claim 3 wherein each identified peak represents a periodicity of the query.

6. The computer-readable storage medium of claim 3 wherein a peak is a locally maximum value of the frequency spectral within a range with a property as represented by the following:

$$S_N(\lambda_j) \geq S_N(\lambda),$$

$$\text{where } \lambda \in \left[\lambda_j - \frac{1}{2\sqrt{N}}, \lambda_j + \frac{1}{2\sqrt{N}}\right].$$

7. The computer-readable storage medium of claim 3 including adjusting the frequencies to have a zero mean prior to calculating the values of the frequency spectral.

8. The computer-readable storage medium of claim 3 wherein the query is a query submitted to a search engine service and the frequency for an interval represents the number of times the query was submitted to the search engine service during that interval.

9. The computer-readable storage medium of claim 3 wherein a periodicity of a query is based on an inverse of the angular frequency of the peak.

10. The computer-readable storage medium of claim 9 wherein the periodicity is $2\pi$ divided by the angular frequency of the peak.

11. A computing device for determining time dependency of a query, comprising:
- a query frequency store storing number of times the query was submitted to a search engine during intervals;
- a memory storing computer-executable instructions of
  - a component that calculates a value of the frequency spectral for each of a plurality of angular frequencies of the query based on the stored frequency of the queries at each of the plurality of intervals based on the following equation:

$$S_N(\lambda) = \sum_{t=1}^{N} q_t e^{-i\lambda t} \lambda \in [-\pi, \pi]$$

where $S_N(\lambda)$ represents a value of the spectral frequency for the angular frequency $\lambda$, $q_t$ represents the frequency for interval t, and N represents the number of intervals in the plurality of intervals;
- a component that determines whether the values of the frequency spectral includes peaks, each peak being a locally maximum value within a range of angular frequencies that is based on an inverse of the number of intervals; and
- a component that, when it is determined that the frequency spectral includes no peak, indicates that the query is time-independent, and when it is determined that the frequency spectral includes one or more peaks, indicates that the query is time-dependent; and a processor for executing the computer-executable instructions stored in the memory.

12. The computing device of claim 11 wherein each identified peak represents a periodicity of the query.

13. The computing device of claim 12 wherein the periodicity is $2\pi$ divided by the angular frequency of the peak.

* * * * *